(12) United States Patent
Pilskalns

(10) Patent No.: US 8,904,275 B2
(45) Date of Patent: *Dec. 2, 2014

(54) STRATEGIES FOR ANNOTATING DIGITAL MAPS

(75) Inventor: Orest J. Pilskalns, Battle Ground, WA (US)

(73) Assignee: Washington State University, Pullman, VA (US)

(*) Notice: Subject to any disclaimer, the term of this patent is extended or adjusted under 35 U.S.C. 154(b) by 314 days.

This patent is subject to a terminal disclaimer.

(21) Appl. No.: 13/108,699

(22) Filed: May 16, 2011

(65) Prior Publication Data

US 2011/0214047 A1 Sep. 1, 2011

Related U.S. Application Data

(63) Continuation of application No. 11/465,731, filed on Aug. 18, 2006, now Pat. No. 7,945,852.

(60) Provisional application No. 60/801,784, filed on May 19, 2006.

(51) Int. Cl.
*G06F 17/20* (2006.01)
*G06F 17/30* (2006.01)
*G06F 17/22* (2006.01)
*G06F 17/24* (2006.01)

(52) U.S. Cl.
CPC ........ *G06F 17/241* (2013.01); *G06F 17/30241* (2013.01); *G06F 17/2235* (2013.01); *G06F 17/30893* (2013.01)
USPC .......................................................... 715/230

(58) Field of Classification Search
CPC .................................................... G06F 17/218
USPC ................................................. 715/766, 230
See application file for complete search history.

(56) References Cited

U.S. PATENT DOCUMENTS

| | | | |
|---|---|---|---|
| 4,661,811 A * | 4/1987 | Gray et al. ..................... 345/636 |
| 6,208,353 B1 | 3/2001 | Ayer et al. |
| 6,584,479 B2 | 6/2003 | Chang et al. |
| 6,697,838 B1 | 2/2004 | Jakobson |
| 6,859,909 B1 | 2/2005 | Lerner et al. |
| 7,068,309 B2 | 6/2006 | Toyama et al. |
| 2001/0034588 A1 | 10/2001 | Agrawals et al. |
| 2001/0045949 A1* | 11/2001 | Chithambaram et al. .... 345/418 |

(Continued)

OTHER PUBLICATIONS

Toyama, Kentaro, Ron Logan, and Asta Roseway. "Geographic location tags on digital images." In Proceedings of the eleventh ACM international conference on Multimedia, pp. 156-166. ACM, 2003.*

(Continued)

*Primary Examiner* — Frank D Mills
(74) *Attorney, Agent, or Firm* — Lee & Hayes, PLLC

(57) ABSTRACT

A strategy is described for annotating a digital map. According to one exemplary aspect, the user can link a single uploaded object to multiple locations within a map (or maps) without requiring separate uploading and storing operations. According to another exemplary aspect, the user can specify a range of zoom levels in which an object is made visible on the map. According to another exemplary aspect, the user can instruct map processing functionality (MPF) to automatically extract objects from a data source (such as an RSS data source) and annotate the map with the objects. Still further aspects are described.

4 Claims, 18 Drawing Sheets

(56) References Cited

U.S. PATENT DOCUMENTS

| | | | |
|---|---|---|---|
| 2002/0078035 A1 | 6/2002 | Frank et al. | |
| 2002/0103892 A1* | 8/2002 | Rieger, III | 709/223 |
| 2003/0033296 A1 | 2/2003 | Rothmuller et al. | |
| 2003/0038836 A1* | 2/2003 | Ronald et al. | 345/738 |
| 2004/0162669 A1* | 8/2004 | Nagamasa | 701/208 |
| 2004/0210833 A1 | 10/2004 | Lerner et al. | |
| 2004/0220906 A1 | 11/2004 | Gargi et al. | |
| 2004/0225635 A1 | 11/2004 | Toyama et al. | |
| 2005/0027705 A1* | 2/2005 | Sadri et al. | 707/5 |
| 2005/0097451 A1 | 5/2005 | Cormack et al. | |
| 2005/0137791 A1 | 6/2005 | Agrawala et al. | |
| 2005/0209774 A1* | 9/2005 | Finlay | 701/208 |
| 2005/0219268 A1* | 10/2005 | Kyle | 345/660 |
| 2005/0231392 A1* | 10/2005 | Meehan et al. | 340/995.1 |
| 2005/0270311 A1* | 12/2005 | Rasmussen et al. | 345/677 |
| 2005/0278371 A1 | 12/2005 | Funk et al. | |
| 2006/0026170 A1* | 2/2006 | Kreitler et al. | 707/10 |
| 2006/0041375 A1 | 2/2006 | Witmer et al. | |
| 2006/0058949 A1* | 3/2006 | Fogel et al. | 701/208 |
| 2006/0075442 A1 | 4/2006 | Meadow | |
| 2006/0136127 A1* | 6/2006 | Coch et al. | 701/208 |
| 2006/0139375 A1* | 6/2006 | Rasmussen et al. | 345/641 |
| 2006/0197781 A1* | 9/2006 | Arutunian | 345/629 |
| 2006/0241860 A1 | 10/2006 | Kimchi et al. | |
| 2006/0247845 A1* | 11/2006 | Cera et al. | 701/117 |
| 2006/0253246 A1* | 11/2006 | Cera et al. | 701/117 |
| 2006/0271280 A1 | 11/2006 | O'Clair | |
| 2007/0088897 A1 | 4/2007 | Wailes et al. | |
| 2007/0112729 A1 | 5/2007 | Wiseman et al. | |
| 2007/0118430 A1 | 5/2007 | Wiseman et al. | |
| 2007/0118520 A1 | 5/2007 | Bliss et al. | |
| 2007/0156332 A1 | 7/2007 | Wailes et al. | |
| 2007/0176796 A1 | 8/2007 | Bliss et al. | |
| 2007/0198951 A1 | 8/2007 | Frank | |
| 2007/0200713 A1 | 8/2007 | Weber et al. | |
| 2007/0203645 A1 | 8/2007 | Dees et al. | |
| 2007/0204218 A1 | 8/2007 | Weber et al. | |
| 2007/0233367 A1 | 10/2007 | Chen et al. | |
| 2007/0244634 A1 | 10/2007 | Koch et al. | |
| 2007/0253343 A1 | 11/2007 | Malik | |
| 2007/0258642 A1 | 11/2007 | Thota | |
| 2008/0306921 A1 | 12/2008 | Rothmuller et al. | |

OTHER PUBLICATIONS

2RealEstateAuctions.com homepage, available at <<http://www.2RealEstateAuctions.com>> accessed on Oct. 4, 2006, 5 pages.
A Complete Set of Mapping Tools & GEO Services: AltarisVIEW Mapping and GEO Services Mapping, available at <<http://www.it.northropgrumman.com/MMPDFs/10_Mapping.pdf>> accessed on Oct. 4, 2006, 2 pages.
Blair, Personal Maps Emerge as Visual Mix Tapes, All Things Considered, NPR introductory partal to audio presentation, Apr. 7, 2006, available at <<http://www.npr.org/templates/story/story.php?storyId=5330820>> accessed on Oct. 4, 2006, 1 page.
Blogmapper.com homepage, available at <<http://blogmapper.com/>>, accessed on Oct. 4, 2006, 1 page.
Carolis, et al., Generating Personalized Tourist Map Descriptions, available at <<http://www.di.uniba.it/intint/people/papers/DecarolisIEA-AIE.pdf>> accessed on Oct. 3, 2006, 11 pages.
Dude, Where's My Used Car?, available at <<https://www.dudewheresmyusedcar.com/>> accessed on Oct. 20, 2006, 1 page.
Dybwad, How to Make Your Own Annotated Multimedia Google Map, Mar. 8, 2005, Engadget, pp. 1-6, retrieved from the internet at http://www.engadget.com/2005/03/08/how-to-make-your-own-annotated-multimedia-google-map.
Engadget: How to GPS Tag Photos: Flickr, Mappr, Google Earth . . . , available at <<http://www.makezine.com/blog/archive/2005/07/how_to_gps_tag.html>> accessed on Oct. 3, 2006, 18 pages.
Essential Resources for Google Maps, available at <<http://www.lifehack.org/articles/lifehack/essential-resources-for-google-maps.html>> accessed on Oct. 3, 2006, 25 pages.
Frappr.com homepage, available at <<http://www.frappr.com/>> accessed on Oct. 20, 2006, 1 page.
Geek to Live: Map yourself, presented on lifehacker.com, available at <<http://www.lifehacker.com/software/google-maps/geek-to-live-map-yourself-165157.php>>accessed on Oct. 20, 2006, 8 pages.
Google Mapping, available at <<http://www.gnik.com/maps/google/>> accessed on Oct. 3, 2006, 4 pages.
Google Maps, description on Wikipedia.com, available at <<http://en.wikipedia.org/wiki/Google_Maps>> accessed on Oct. 3, 2006, 7 pages.
Graywolf's SEO Blog, Annotated Google Chicago Vacation Map, available at <<http://www.wolf-howl.com/google/annotated-google-chicago-vacation-map/>> accessed on Oct. 3, 2006, 6 pages.
Graywolf's SEO Blog: How to Annotate Google Maps, available at <<http://www.wolf-howl.com/google/how-to-annotate-google-maps/>> accessed on Oct. 3, 2006, 6 pages.
Make technology on your time blog, How to GPS Tag Photos: Flickr, Mappr, Google Earth . . . , available at <<http://www.makezine.com/blog/archive/2005/07/how_to_gps_tag.html>> accessed on Oct. 3, 2006, 15 pages.
Information from CommunityWalk.com website, available at <<http://communitywalk.com/#tab=example>> accessed Oct. 4, 2006, 5 pages.
John L. Scott real estate interactive search page, available at <<http://www.johnlscott.com/SearchInteractive.aspx>> accessed on Oct. 20, 2006, 1 page.
John L. Scott real estate search homepage, available at <<http://www.johnlscott.com/Default.aspx>> accessed on Oct. 3, 2006, 1 page.
JourneySat homepage, available at <<http://journeysat.sourceforge.net/>>, accessed on Oct. 4, 2006, 1 page.
Lim, et al., Map-Based Digital Library for Distributed Geospatial and Georeferenced Resources, Jul. 2002, ACM JCDL 2002, pp. 351-358.
Mapki.com article entitled Map Projects, available at <<http://mapki.com/index.php?title=Map_Projects>> accessed on Oct. 4, 2006, 2 pages.
MapTracer Utility, available at <<http://maptracer.50webs.com/tracer.htm>> accessed on Oct. 20, 2006, 1 page.
My childhood, seen by Google Maps, available at <<http://www.flickr.com/photos/mathowie/8496262/>> accessed on Oct. 3, 2006, 7 pages.
New! Google local business ads BETA, available at <<https://adwords.google.com/select/localbusinessads.html>> accessed on Oct. 4, 2006, 2 pages.
Ben O'Neill, BBC News Maps, available at <<http://benedictoneill.com/projects/newsmap>>,accessed on Oct. 4, 2006, 2 pages.
Dr. Orest Pilskalns, Assignment Description of CS420, Spring 2006, assignment #1: The Geospatial Registration Project—Iteration 1, available at <<http://bitterroot.vancouver.wsu.edu/cs420/homework/Team_Assignment_1.pdf>> 4 pages.
Dr. Orest Pilskalns, class syllabus for Software Engineering in Practice—CS 420, Spring 2006, available at <<http://bitterroot.bancouver.wsu.edu/cs420/docs/Syllabus%20420.pdf>> accessed on Oct. 20, 2006, 3 pages.
Dr. Orest Pilskalns, class website for Software Engineering in Practice—CS 420, Spring 2006, available at <<http://bitterroot.vancouver.wsu.edu/cs420/>>, accessed on Oct. 20, 2006, 2 pages.
RSS-Planet: Implementation by Martin C. Doege after an idea by Nathan Eckenrode, available at <<http://home.arcor.de/mdoege/rss-planet/>> accessed on Oct. 4, 2006, 4 pages.
Xtech conference, Sharing Places—share located media with the world, Xtech conference, May 2006, available at <<http://xtech06.usefulinc.com/schedule/paper/195>> accessed on Oct. 3, 2006, 5 pages.
ShowMeWhere homepage, available at <<http://showmewhere.net/gmap/index.php>> accessed on Oct. 4, 2006, 1 page.
Toyama, et al., Geographic Location Tags on Digital Images, Nov. 2003, ACM MM 2003, pp. 156-166.
Udell, Annotating the planet with Google Maps, InfoWorld, Mar. 4, 2005, available at <<http://www.infoworld.com/article/05/03/04/10OPstrategic_1.html>> accessed on Oct. 3, 2006, 2 pages.
Wayfaring.com homepage, available at <<http://www.wayfaring.com/>>, accessed on Oct. 20, 2006, 1 page.
Windermere real estate interactive search page, available at <<http://www.windermere.com/index.cfm?fuseaction=listing.searchPropertyMapv2>> accessed on Oct. 20, 2006, 1 page.
Windermere real estate search homepage, available at <<http://www.windermere.com/>> accessed on Oct. 12, 2006, 1 page.

* cited by examiner

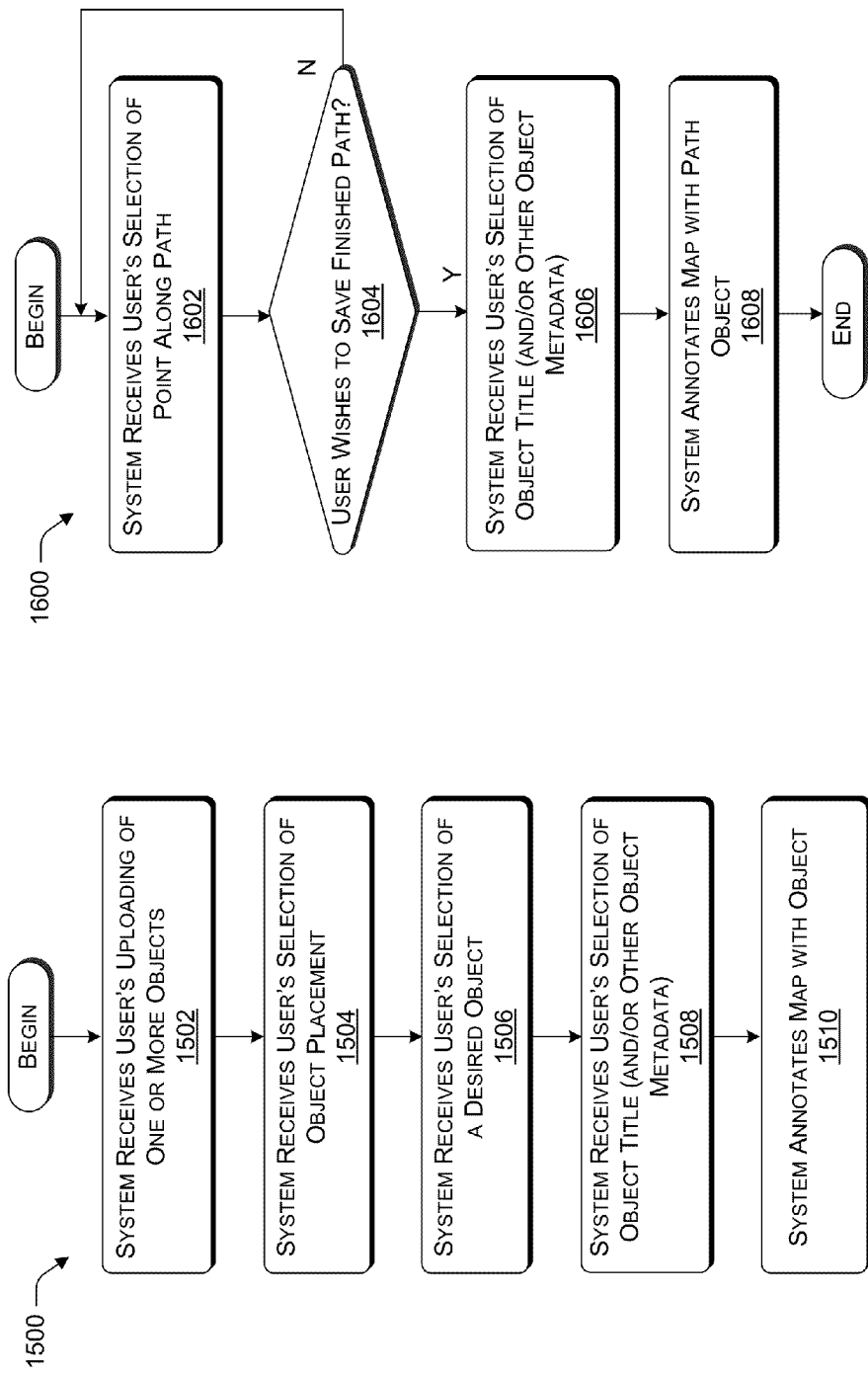

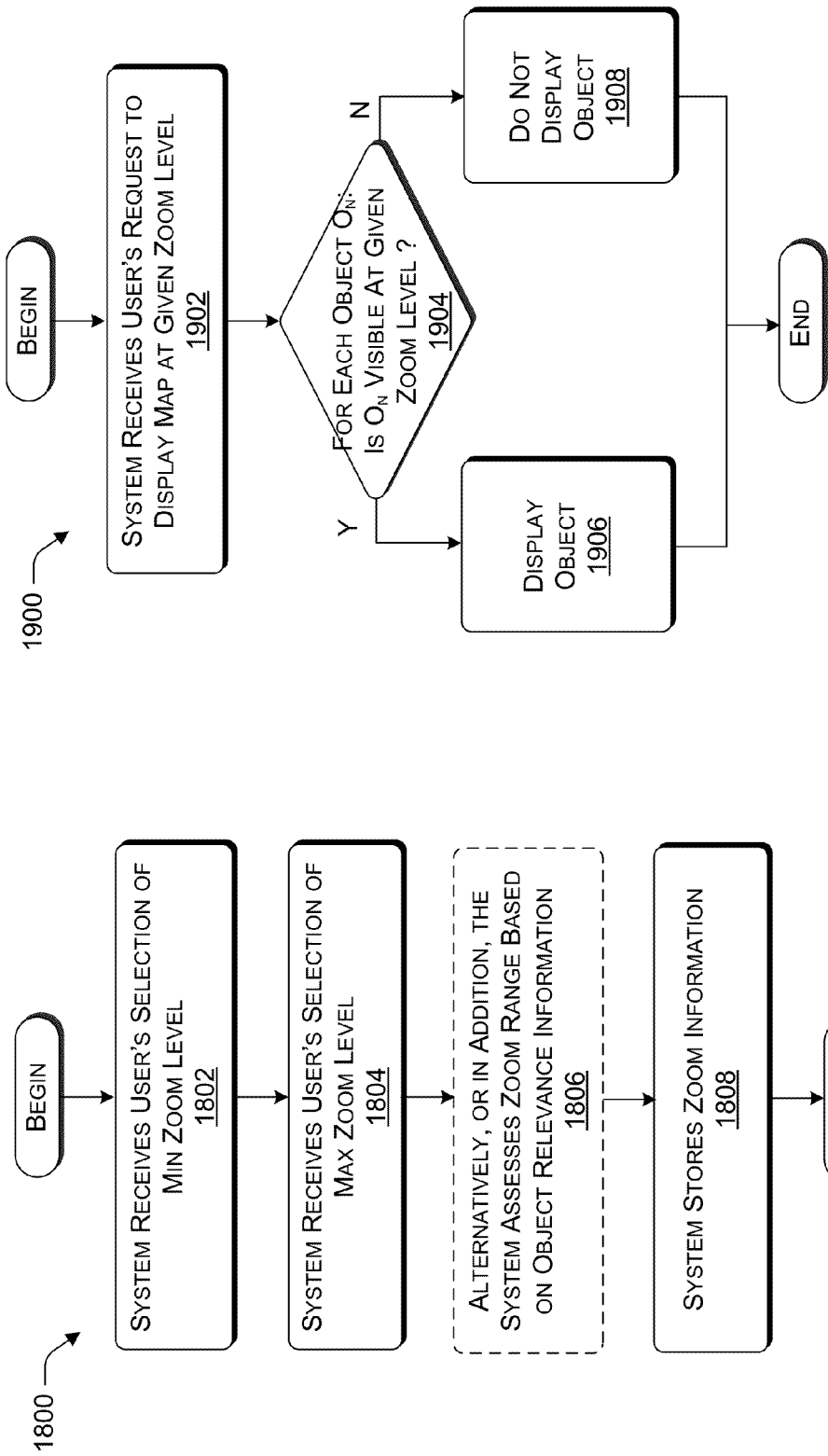

STRATEGIES FOR ANNOTATING DIGITAL MAPS

CROSS-REFERENCE TO RELATED APPLICATIONS

This application is a continuation of, and claims priority to, U.S. patent application Ser. No. 11/465,731, filed on Aug. 18, 2006, entitled "Strategies for Annotating Digital Maps," and naming Orest J. Pilskalns as inventor. This application further claims the benefit of U.S. Provisional Application No. 60/801,784, filed on May 19, 2006, entitled "GEOSPACE SYSTEM FOR SHARING INFORMATION IN A GEOSPATIAL CONTEXT," and naming Orest J. Pilskalns as inventor. Both cross-referenced applications are incorporated by reference herein in their entirety.

BACKGROUND

Numerous tools exist for electronically presenting geographic information to users. The geographic information conventionally provides a map that shows locations of roadways, population centers, natural landscape features, and so forth. The geographic information may also overlay other information "on top" of the map that pertains to a particular subject. To cite merely one example, geographic information may overlay historical-based rainfall data on a map of a particular region to convey how rainfall is distributed across the region.

There remains room for improvement in the above-described technology for presenting geographic information.

SUMMARY

A strategy is described for annotating a digital map. According to one exemplary aspect, the strategy involves uploading an object in response to a first instruction. The object may correspond to a digital photograph, media file, document, and so on. The to a selected location within a map, to thereby provide an annotated map. The same uploaded object can be linked to multiple locations within a single map or to multiple locations in different maps without requiring a user to upload and store separate instances of the object.

According to another exemplary aspect, the strategy involves giving the user the option of saving the annotated map based on a security option selected from a group of possible security options. The security options include: publishing the annotated map without any access restrictions; publishing the annotated map so that the map can be accessed by a permitted group of users (e.g., based on a password-protection mechanism); and retaining the annotated map so that the map can be accessed only by the user. The strategy involves receiving the user's selection of one of the security options and then governing access to the annotated map by other users based on the selected security option. In this strategy, multiple maps may make reference to a single object, yet these different maps may grant access to the object based on different respective security options.

According to another exemplary aspect, the strategy involves receiving the user's instruction to annotate a map with an object, along with a minimum zoom level and a maximum zoom level. The strategy further involves receiving an instruction to present the map at a requested zoom level, determining whether to present the object within the map depending on whether the requested zoom level lies within a range specified by the minimum zoom level and the maximum zoom level, and then presenting the map based on an outcome of the above-identified determining operation. In an alternative case, the strategy can automatically select a zoom range based on an assessed relevance of the object, e.g., as gauged by the popularity of the object.

According to another exemplary aspect, the strategy involves receiving the user's selection of a data source, along with the user's selection of at least one annotation selection criterion. The strategy further involves investigating the data source at a particular instance of time to determine whether it includes an object which satisfies the selection criterion, to provide an identified object. If the selection criterion is satisfied, the strategy involves automatically identifying a location associated with the identified object. The strategy then involves automatically annotating a map with the identified object at the identified location. In one exemplary implementation, the identified data source is a Really Simple Syndication (RSS) feed data source and the selection criteria can include a key term. As a supplemental feature, the strategy can also involve assessing a level of relevance of the identified object and selecting a zoom range in which the identified object is made visible based on the assessed level of relevance.

This Summary section refers to exemplary and non-limiting manifestations of the subject matter described herein, and hence does not limit the scope of the invention set forth in the Claims section.

BRIEF DESCRIPTION OF THE DRAWINGS

FIG. 15 shows an exemplary procedure for manually uploading objects and annotating a map with the uploaded objects.

FIG. 16 shows an exemplary procedure for annotating a map with a path.

FIGS. 18 and 19 show an exemplary procedure for governing the presentation of an object based on user-selectable minimum and maximum zoom levels.

Figure 1:
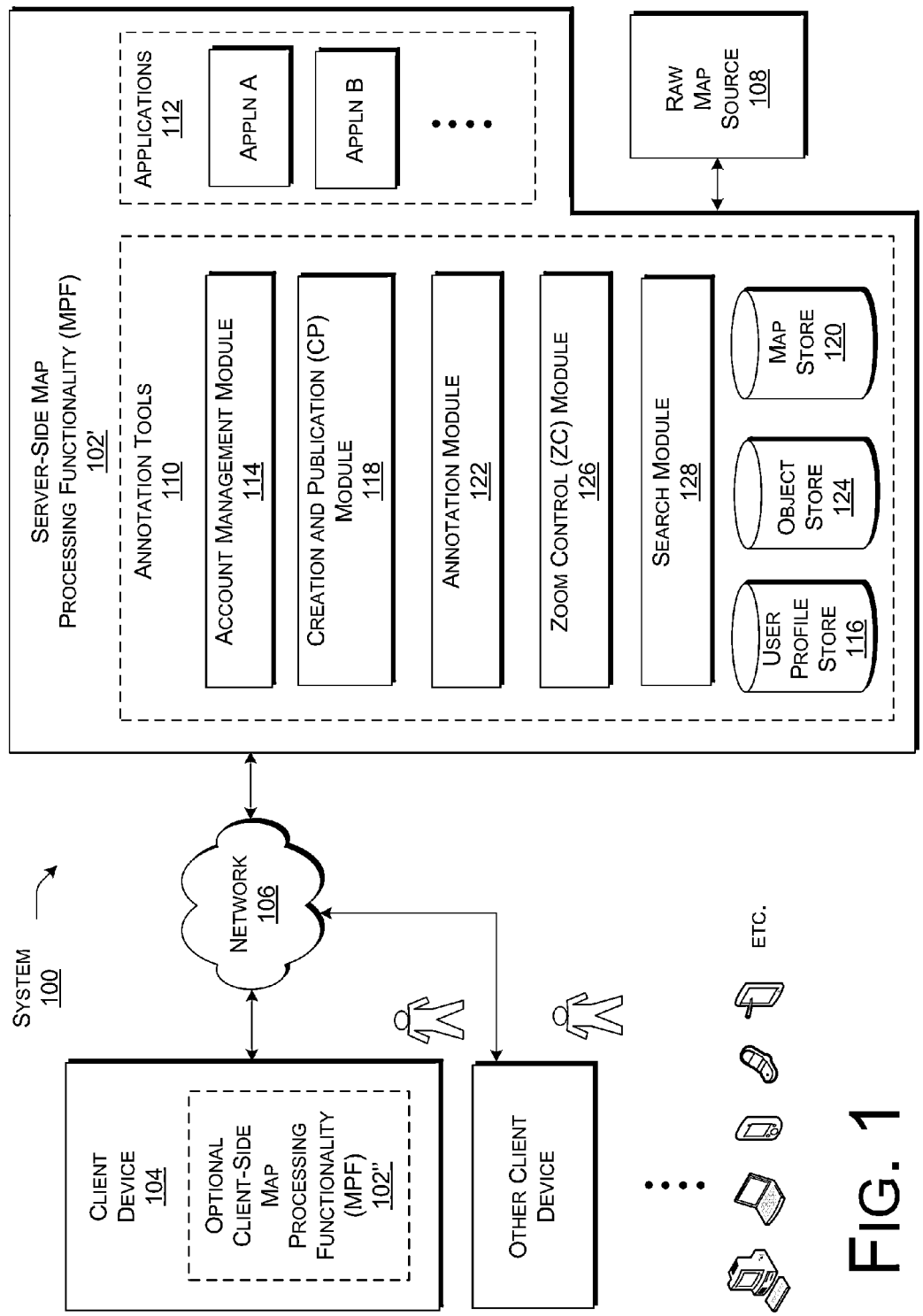
FIG. 1 shows an exemplary system for annotating maps.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for annotating a map with one or more objects. The strategy also provides provisions for publishing the map and selectively sharing the map with others.

The term "map" refers to any spatial representation of information. In the case most commonly evoked herein, the map may depict the spatial organization of features within a physical landscape, including roadways, population centers, natural features (rivers, lakes, etc.), and so on. In other cases, the map may depict the spatial organization of features within some other physical setting, such the organization of various features that make up the layout of office space. In still other cases, the map may depict the organization of features in a conceptual framework that has no direct physical counterpart, such as in the case of a map which uses a spatial metaphor to depict the organization of items within a database.

The term "object" likewise has broad connotation. The term "object" encompasses any kind of information that can be associated with a location in a map. An object may be composed of, but is not limited to, textual or symbolic (e.g., iconic) labels, digital pictures, video files, audio files, hypertext links, text documents, additional map information, and so on.

The term "user" may refer to any person or entity which interacts with the map for any reason. In certain cases, the disclosure adopts the more specific term of "authoring-user" to refer to a user who creates some aspect of an annotated map, such as by linking one or more objects to the map. An "end-user" refers to a user who uses an annotated map produced by authoring-user. An authoring-user and an end-user may describe different users or the same user.

The disclosure includes the following sections. Section A sets forth exemplary systems for annotating maps. Section B describes exemplary procedures which explain the operation of the systems of Section A.

A. Exemplary System (FIGS. 1-14)

As a preliminary matter, any of the functions described with reference to the figures can be implemented using software, firmware, hardware (e.g., fixed logic circuitry), manual processing, or a combination of these implementations. The term "logic, "module" or "functionality" as used herein generally represents software, firmware, hardware, or a combination of these elements. The program code can be stored in one or more computer readable media.

Further, the illustrated separation of logic, modules and functionality into distinct units may reflect an actual physical grouping and allocation of such software, firmware, and/or hardware, or can correspond to a conceptual allocation of different tasks performed by a single software program, firmware program, and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

A.1. Overview of Exemplary System for Annotating Maps

A.1.1. Overall System

FIG. 1 shows an exemplary system 100 for use in annotating a map. In the illustrated (but non-limiting) environment shown in FIG. 1, the system 100 includes server-side map processing functionality (MPF) 102' for interacting with one or more client devices, such as representative client device 104. In the implementation most often evoked herein, the system 100 allocates all (or most) of the map-related functionality to the server-side MPF 102'. In an alternative case, the map-related functionality can be distributed between the server-side MPF 102' and optional client-side map processing functionality (MPF) 102". In yet another alternative case, selected features of the system 100 can be implemented using peer-to-peer (P2P) technology, thereby reducing or eliminating the role of the server-side MPF 102'.

The client device 104 can interact with the MPF 102' via a network 106. The network 106 can comprise one or more wide area networks (WANs) and/or one or more local area networks (LANs). For example, the network 106 can be implemented as a packet-based WAN, such as the Internet. The network 106 can include any combination of physical and/or wireless links, governed by any protocol or combination of protocols.

Turning to the server-side aspects of the system 100, the purpose of the MPF 102' is to annotate a map produced by a raw map source 108. The map produced by the raw map source 108 therefore serves as a base or substrate. The MPF 102' metaphorically annotates the map by "placing" objects "on top" of the underlying map substrate.

The raw map source 108 represents any entity or combination of entities that produces an underlying digital map. As stated above, the term "map" is intended to have broad connotation, referring to any representation of the spatial organization of features within an area. In the case most commonly evoked, a map represents a tract of land that shows the location of roadways, population centers, natural landscape features, and so forth. The raw map source 108 can generate a map based on information collected from various sources, such as satellite photographs, aerial photographs, various cartographic databases, and so forth. The raw map source 108 can specify the location of elements within such a map using any kind of coordinate system. In a common case, the map has two dimensions. The elements in this type of map can be unambiguously described by specifying the X-Y coordinates of these elements. In other implementations, a map generated by the raw map source 108 can have three or more dimensions.

In one implementation, the entity that administers the server-side MPF 102' is the same entity that administers the raw map source 108. In this case, the MPF 102' allows the user to annotate maps that the MPF 102' itself produces. In another implementation, different respective entities administer the server-side MPF 102' and the raw map source 108. In this case, the MPF 102' may allow the user to annotate maps that are made publicly available by another commercial entity. For example, the MPF 102' can be used to annotate raw maps produced by Yahoo, Inc. of Sunnyvale, Calif., or Google, Inc. of Mountain View, Calif., and so on. In other words, the raw map source 108 in this case corresponds to a website administered by Yahoo, Inc., Google, Inc., and so on.

The server-side MPF 102' itself includes a collection of annotation tools 110 and one or more applications 112. The annotation tools 110 refer to modules that perform basic operations related to the annotation of maps. The applications 112 refer to functionality that incorporates one or more of the annotation tools 110 or which otherwise relies on one or more of the annotation tools 110. In one case, a single entity administers both the annotation tools 110 and the applications 112. In another case, a first entity may administer the annotation tools 110, while one or more other entities may create the applications 112 which rely on the annotation tools 110.

Section B provides details regarding exemplary applications 112 that can utilize the annotation tools 110.

The remainder of this subsection provides an overview of the annotation tools 110 shown in FIG. 1. Other subsections provide more detail regarding selected tools in the collection of annotation tools 110.

A first tool comprises an account management module 114. The purpose of the account management module 114 is to establish and maintain user accounts. A user account enables a user to interact with the MPF 102'. In one exemplary implementation, the account management module 114 registers a user by collecting various information items regarding the user, such as: the name of the user; the physical address of the user; the Email address of the user; a billing address of the user and payment arrangements made by the user (if the MPF 102' is optionally set up as a fee-based service); a user-selected ID; a user-selected password, and so on. The account management module 114 can store all of the collected information items in a user profile store 116. The account management module 114 can subsequently grant access to the MPF 102' in conventional fashion by requiring the user to enter his or her pre-established user ID and password.

The MPF 102' can also include a map creation and publication module 118, referred to for brevity as the CP module 118. As the name suggests, the CP module 118 performs two roles. As a first role, the CP module 118 allows the user to create a new map. It performs this task by allowing the user to access a particular map created by the raw map source 108 and then store this map as a user-selected file name. Further, the CP module 118 allows the user to assign a default view and scale to the created map. The view establishes a center of focus of the map, as in a map which focuses on the city of Yakima has a first view and a map that focuses on the city of Spokane has a second focus. The scale defines a level of magnification of the map. When a previously-created map is later activated, the CP module 118 can present the map using the stored default view and scale.

As a second role, the CP module 118 allows the user to publish a map so that other users can potentially access this map. The CP module 118 publishes the map based on a user's selection of a security option. A first selectable security option allows the user to publish the map without restriction, thereby enabling any user to access the map without restriction. A second security option allows the user to publish the map in protected form, such as by making access to the map dependent on the input of a valid password. This security provision allows only a group of users who happen to know the password to access the map. A third option allows the user to store the map in a private form such that only the user himself or herself can access the map.

Presuming that a user can access the map, the CP module 118 can optionally allow the user to perform various actions with respect to the map. For example, the CP module 118 can optionally allow a user to modify a map created by another user. The CP module 118 can also optionally allow the user to transfer a map to another user (e.g., via Email, Instant Messaging, etc.). Through these sharing provisions, the system 100 can establish a social network that is centered on the use of a map of common interest to the members of the network. To cite merely one example, the system 100 can allow a group of outdoor enthusiasts to establish a community map that reflects a shared interest in a national park. Any of the users can annotate the community map with photographs, textual descriptions, links to personal maps, and so forth, such that the community map presented at any given time may reflect the collaborative input of many users. Section B (below) describes exemplary applications that rely on sharing provisions enabled by the CP module 118.

The CP module 118 can retain annotated maps in a map store 120. In one case, the map store 120 stores actual map data that is used to construct the maps, including underlying raw map "substrate" data. In another case, the map store 120 provides references which simply point to raw map data maintained by some other entity, such as the raw map source 108. In other words, in the latter case, the map store 120 may not store actual raw map data.

The MPF 102' can also include an annotation module 122. The annotation module 122 implements several operations devoted to supplementing a map with objects. As stated above, the term "objects" has broad connotation. An object can represent any type of information, including, but not limited to: alphanumeric labels; iconic labels; still picture information (such as JPEG digital photographs, etc.); audio information (such as music, sound effects, spoken-word content, etc.); video content (such as MPEG video, etc.); path-related information; hypertext link-related information; Extensible Markup Language (XML) scripts; Flash content; additional map information, and so on.

The annotation module 122 can associate an object with a defined location within a map. The annotation module 122 can perform this task by linking the object to a defined X-Y position in the coordinate system of the map. In one implementation, this linking is performed by allowing the user to manually point to a location in the map. In another implementation, the object may already have position information associated therewith, such as in the case of a digital photograph that may incorporate GPS data that describes the location where the photograph was taken. In the latter case, the annotation module 122 can include a conversion module (not shown) which converts various ways of representing position information into a standard representation of position. This provision effectively allows different sources of geographic information to be combined together, such as by allowing an object with an X-Y position specified using a first coordinate system to be placed on a map that is structured using a second coordinate system.

The annotation module 122 can function in a manual mode or an automatic mode. In the manual mode, the annotation module 122 can allow the user to: (a) select a location within a map; (b) select an object to be placed at the selected location; and (c) link the selected object to the selected location on the map. As a preliminary task, the annotation module 122 can allow the user to upload certain objects to an object store 124. For example, the user can upload digital pictures, media files, text documents, etc. to the object store 124. The annotation module 122 can then allow the user to link an uploaded object stored in the object store 124 to a selected location on the map. Indeed, in one implementation, the annotation module 122 can allow the user to link the same uploaded object to multiple locations within a single map or various locations in different respective maps. This linking operation does not require the user to perform multiple uploading and storing operations to establish redundant copies of the object. This provision is beneficial because it reduces the processing and storage burden placed on the MPF 102', and also potentially results in a better end-user experience.

The manual mode of the annotation module 122 also allows the user to annotate the map with a path. For example, the path may represent a travel route. As will be set forth more fully below, the annotation module 122 can allow the user to create a path by successively specifying path nodes on the map. The path nodes define different segments (or "legs") of the path.

In the automatic mode of operation, the annotation module 122 automatically investigates a data source, extracts one or more objects from the data source, and then links the extracted objects to a map. In operation, the annotation module 122 first receives set-up information which specifies at least one data source and at least one selection criterion. The annotation module 122 can then mine the specified data source to identify objects that satisfy the selection criterion. To present one concrete example, the user may select a Really Simple Syndication (RSS) news feed as a data source. The user may specify an alphanumeric search term as a selection criterion. Based on these inputs, the annotation module 122 can periodically examine the RSS feed source to identify any objects that include the alphanumeric search term.

In a next stage of automatic annotation processing, the annotation module 122 can determine location information associated with an object extracted from the data source. In one implementation, the annotation module 122 can perform this task by identifying the presence of predefined alphanumeric map-related information in the object, such as the name of a country, city, etc. In a next stage, the annotation module 122 can then automatically place the object on the map at a position that is based on the determined location information.

In either the manual or the automatic mode of operation, the annotation module 122 can store the annotated map in the map store 120. In one implementation, the MPF 102' can store a map in the map store 120, yet store the map's objects separately in the object store 124. The map and its associated objects can be linked together using a pointer mechanism or some other linking mechanism. For example, a map can include an associated metadata file which provides file names or other codes which identify the objects used in the map, as well as position data which describe where the objects are placed in the map. The separate storage of maps and objects is efficient because it allows several maps to reference the same object without requiring redundant copies of the objects to be stored.

The MPF 102' also includes a map zoom control (ZC) module 126. The purpose of the ZC module 126 is to establish the zoom levels at which certain objects are made visible in a map. In operation, the ZC module 126 can allows the user to select a minimum zoom level and/or a maximum zoom level. The minimum zoom level and the maximum zoom level define a range of zoom levels. If the user selects a zoom level that lies within the visible range, the ZC module 126 will present a visual depiction of the object in question. If the user selects a zoom level that lies outside the visible range, the ZC module 126 will conceal the object. A range can be selected which has only one fixed endpoint. Such a range is created by specifying either a minimum zoom level or a maximum zoom level, but not both levels.

In another implementation, the ZC module 126 in conjunction with the annotation module 122 can also operate in an automated mode. In the automated mode, the system 100 can determine the relevance of an object based on at least one relevance criterion, and then select a zoom range based on the determined relevance. For example, the system 100 can determine that an object is highly relevant because it has proven popular among users (as reflected by the fact that many users have "clicked on" the object in the map). As a result, the ZC module 126 can define a zoom range that allows the object to appear over a relatively wide range of zoom levels. Other relevance criteria for assessing relevance can be used.

Finally, a map search module 128 allows a user to perform a search that involves map information. The map search module 128 can use the map information in different ways in performing a search. In one technique, the search module 128 can allow the user to search within an individual map by specifying a bounding box within the map. The bounding box demarcates a rectangular area within the map, although the annotation module 128 can also allow the user to select a bounding area having another shape. The user can also specify at least one selection criterion. Based on these selections, the map search module 128 determines whether any objects within the bounding box satisfy the selection criterion. The map search module 128 can then present the results of its determination to the user.

In another case, the map search module 128 can formulate a search term based on information extracted from the map, and then this search term is applied as a query to one or more data sources. In operation, the search module 128 can allow the user to specify a data source and a bounding box. The search module 128 can extract one or more parameters based on objects identified within the bounding box, and can then use these parameters to construct a search term. The search module 128 then uses that search term in performing a search within the selected data source.

In another case, the map search module 128 can allow the user to search a collection of maps, potentially created by different respective users. In operation, the user can enter a search term (and optionally a bounding box). The search module 128 can then investigate the collection of maps to determine whether it includes any objects which match the search term. In performing its search of the maps, the map search module 128 can also perform a supplemental search in one or more other data sources, or otherwise rely on the information in these data sources.

The techniques described above are exemplary; still other search strategies can make use of annotated maps.

A.1.2. Exemplary Processing Functionality

Various components of the system 100 shown in FIG. 1 can be implemented by computer-related processing functionality. For example, the server-side map processing functionality (MPF) 102' can be implemented as one or more server-type computers, in possible conjunction with other data processing equipment, such as storage devices, data routers, and so forth. In one specific implementation, the server-side MPF 102' may represent a web-type server center. The server center may include front-end equipment for interacting with clients. The front-end equipment can be coupled to back-end equipment for performing supporting data processing tasks. More generally, the components of the server-side MPF 102' can be located at a single site or distributed over plural sites.

The raw map source 108 can be implemented in the same manner as the server-side MPF 102', that is, as one or more server-type computers, located at a single site or distributed over plural sites. In one specific implementation, the MPF 102' can be associated with equipment located at a first site, while the raw map source 108 can be associated with equipment located at a second site.

Any client device, such as the representative client device 104, can be implemented as a computer-type processing device. Exemplary computer-type processing devices include personal computers, laptop computers, mobile telephones, personal digital assistants (PDAs), tablet-type input devices, game consoles, set-top boxes, various types of wearable computers, and so forth.

Figure 2:
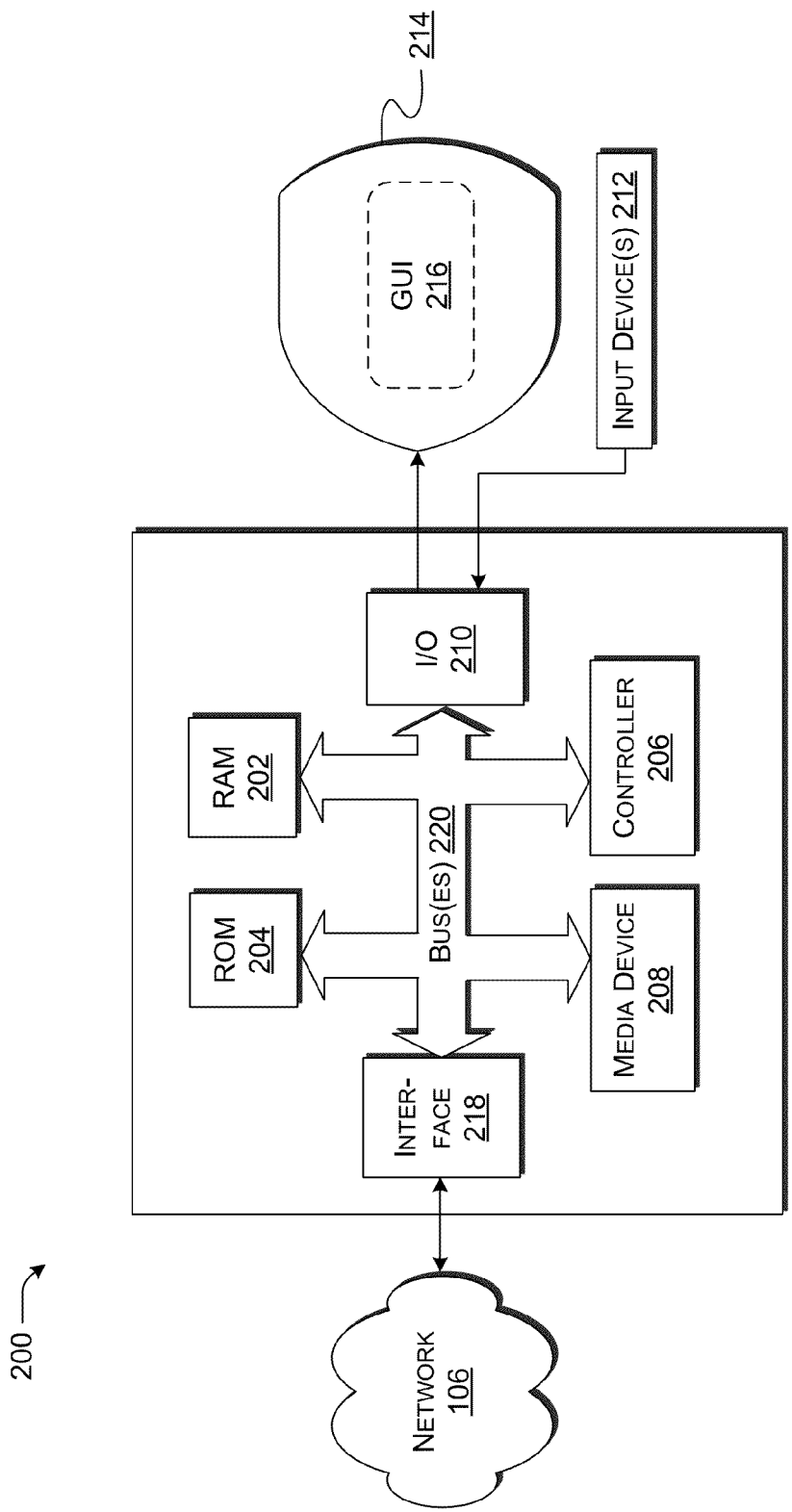
FIG. 2 shows exemplary processing functionality for implementing different features of the system of FIG. 1.

FIG. 2 shows processing functionality 200 that generically represents any server-type computer that can be employed by the server-side MPF 102' or the raw map source 108. The processing functionality 200 can also generically represent a client-side processing device, such as representative client device 104.

The processing functionality 200 includes various kinds of memory, such as RAM 202 and ROM 204. The processing functionality 200 also includes a controller 206. The controller 206 can represent one or more central processing units (CPUs) or some other type of processing engine. The processing functionality 200 can perform various operations identified above when the controller 206 executes instructions that are stored in the memories (202, 204). The processing functionality 200 also optionally includes various media devices 208, such as a hard disk module, an optical disk module, and so forth. The media devices 208 can be used to store information on a more permanent basis than, for example, the RAM 202. In the context of a server-type computer, one or more of the above-described data-storing media can store code instructions that carry out the functions of the MPF 102' when implemented by the controller 206.

The processing functionality 200 also includes an I/O module 210 for receiving input information from the user. More specifically, the user can supply input information using various input devices 212. The I/O module 210 also provides output information via one or more output devices 214. In the particular context of the client device 104, the user output device 214 may comprise a display monitor or like device, which presents a graphical user interface (GUI) 216 to the user. The GUI 216 provides map-related information to the user and also allows the user to enter map-related input selections.

The processing functionality 200 also includes one or more network interfaces 218 for exchanging data with entities via the network 106. The network interfaces 218 can be implemented as broadband connection mechanisms, various type of modem interfaces, and so on.

Finally, one or more buses 220 allow the components of the processing functionality 200 to communicate with each other.

The representation of the processing functionality 200 shown in FIG. 2 is exemplary and non-limiting. Other implementations of the processing functionality 200 can include additional elements and/or can omit one or more elements shown in FIG. 2.

A.1.3. Overview of User Interface Presentation (FIGS. 3-5)

Figure 3:
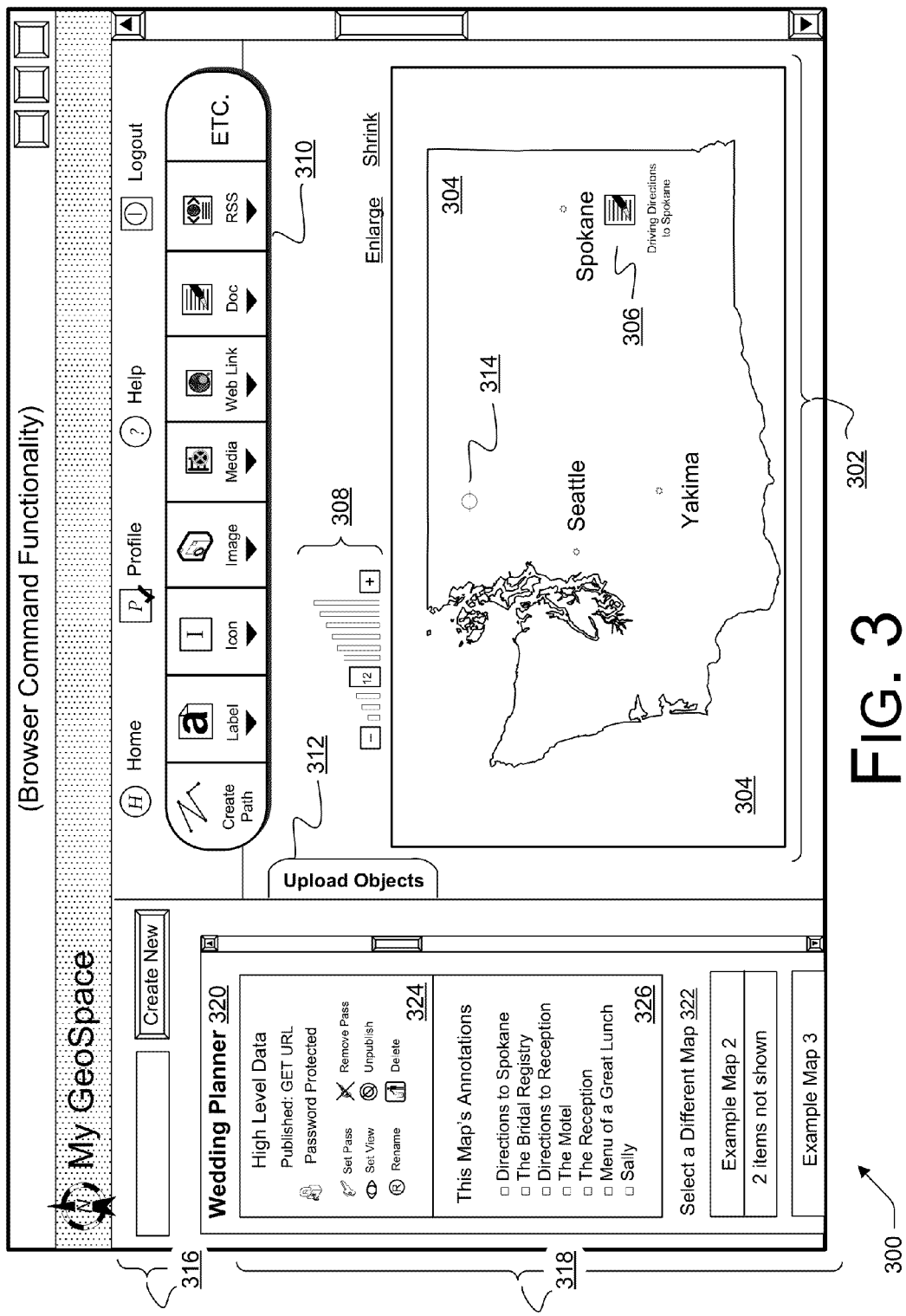
FIGS. 3-5 show an overview of an exemplary user interface produced by the system of FIG. 1.
Figure 4:
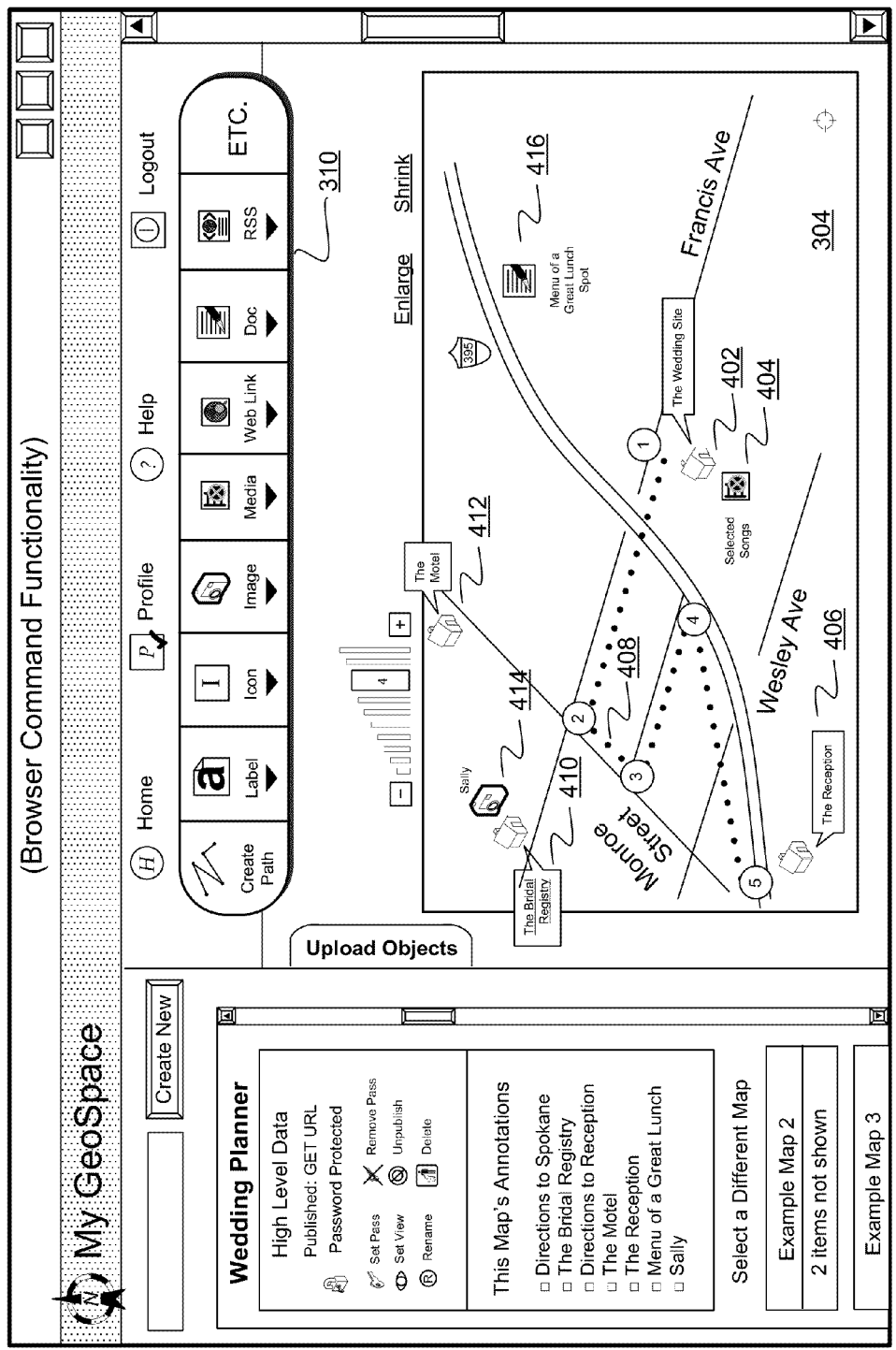
Figure 5:
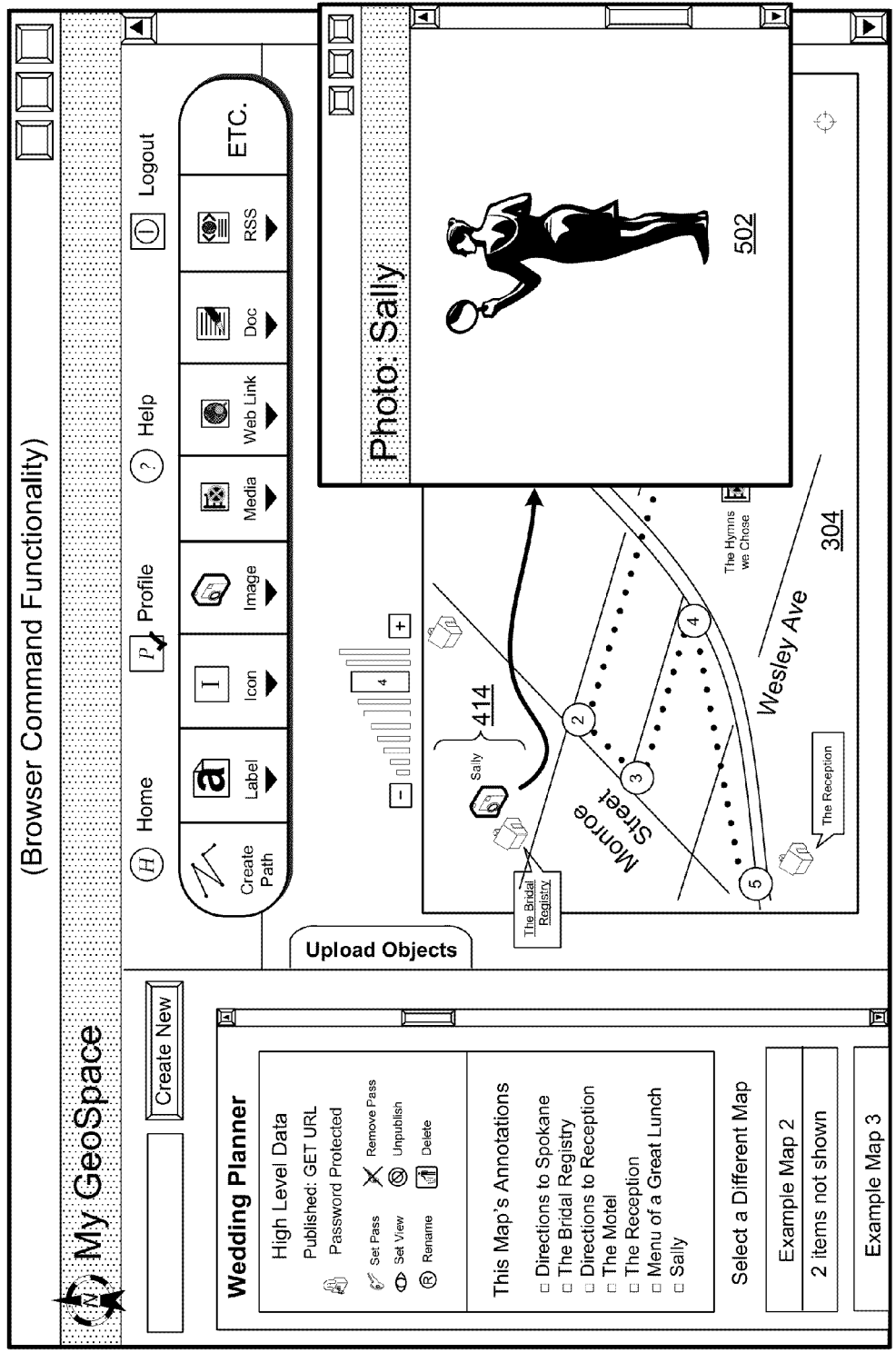

This subsection, in conjunction with FIGS. 3-5, presents an overview of one user interface 300 through which a user may interact with the system 100. Namely, the user interface 300 presents a graphical framework that allows the user to access and interact with the annotation tools 110 of the MPF 102'. It will be understood that the user interface 300 is exemplary and non-limiting. That is, other user interfaces can be implemented which allow the user to interact with the annotation tools 110, where such other user interfaces may adopt different interaction paradigms, presentation styles, etc. compared to the user interface 300 shown in FIGS. 3-5.

The client device 104 can display the user interface 300 on its display screen 214 in the form of the graphical user interface (GUI) 216. In a web-related implementation, the server-side MPF 102' includes programming logic which generates the user interface 300 for presentation on the client device 104 by means of client-side browser functionality. In another implementation, the client device 104 itself can include programming logic which is responsible for generating at least part of the user interface 300.

Beginning with FIG. 3, the user interface 300 is shown as including several sections. Each section can include several portions, and each portion, in turn, can include several sub-portions, and so on. In the context of this explanation, the terms "section" "portion" and "sub-portion" refer to different collections of user interface features. The user interface 300 is described as partitioned in this manner to facilitate explanation, e.g., by directing the reader's attention to certain features of the user interface 300; however, the user interface 300 can actually be implemented as an integral graphical presentation.

One such section is a map display section 302. The map display section 302 presents a map 304. In the entirely exemplary case of FIG. 3, the map 304 depicts the U.S. state of Washington.

The map 304 includes base contents which constitute raw map data, originating from the raw map source 108. Such original features include roadways, population centers, natural features (such as lakes, rivers, etc.), and so on. The map 304 also includes information that is overlaid on the raw map data. More specifically, as stated above, the MPF 102' operates by linking objects to the map 304 at respective locations in the map 304. The MPF 102' may notify the user that objects are linked to the map 304 by displaying respective visible items on the map 304. For example, the map 304 includes an exemplary visible item 306. This visible item 306 is a document icon that represents a document-type object that is linked to the map 304 at a selected X-Y location. In this case, the document-type object includes, as component parts, a visible item 306 and a linked document. In other cases, an object may consist entirely of a visible item (such as an alphanumeric label or icon), having no information linked thereto.

The map display section 302 also includes a scale-adjustment mechanism 308. The scale-adjustment mechanism 308 allows the user to adjust the scale (e.g., magnification) of the map 304. A focus-adjustment mechanism (not shown) allows the user to adjust the view (e.g., focus) of the map 304 using any type of conventional technique. For example, the focus-adjustment mechanism can allow the user to adjust the focus of the map 304 by clicking and dragging on the map 304. The focus-adjustment mechanism can also be implemented using directional arrows (not shown) which allow the user to adjust the focus of the map 304 by activating appropriate directional arrows, e.g., N (north), S (south), E (east), and W (west) arrows.

An annotation section 310 of the user interface 300 allows the user to attach different types of objects to the map 304, including, but not limited to: path-type objects; alphanumeric label-type objects; iconic label-type objects; image-type objects; media-type objects (audio, video, etc.); web link-type objects; document-type objects; RSS fed link-type objects; additional map information, and so on. More specifically, the annotation section 310 is implemented as a graphical toolbar that includes separate commands. The separate commands allow the user to link different respective objects to the map 304. In other words, if a user wishes to link a specific kind of object to the map 304, the user activates a corresponding command in the annotation section 310.

Later parts of this document elaborate on various mechanisms that can be used to link an object to the map 304. Different techniques may be appropriate for linking different kinds of objects to the map 304. By way of overview, according to one technique, the MPF 102' allows a user to link an object to the map 304 by first uploading the object to the object store 124. The user can initiate this uploading operation by activating an "Upload Objects" command tab 312. The user can then select a desired location on the map 304 by moving a position indicator 314 to the desired location (e.g., by using a mouse device to move the position indicator 314 to the desired location). The user can then activate an appropriate command within the annotation section 310. For instance, if the user has uploaded a document-type object, the user can activate a "Doc" command within the annotation section 310 to link this object to the map 304. The MPF 102' then links the selected object to the selected location on the map 304. In the example of FIG. 3, the visible item 306 represents a document-type object in the map 304. The user may activate the document-type object by clicking on the visible item 306.

Other objects that a user can link to the map 304 do not need to be uploaded to the object store 124 in advance of the linking operation. For example, the user can add a label-type object to the map 304 by activating an appropriate command in the annotation section 310. Label-type objects optionally do not need to be uploaded to the object store 124 as a precondition to linking these objects to the map 304.

A map-creation section 316 allows the user to create a new map. For example, assume that the user wishes to store the annotated map 304 as a new map. To perform this operation, the user can enter a name of the map 304 in a text box in the map-creation section 316. In the example of FIG. 3, the user has previously labeled the map 304 as "Wedding Planner." The user can then activate the "Create New" command in the map-creation section 316 to create a map having the specified title.

A map summary section 318 of the user interface 300 provides a summary of maps that the user has created. The map summary section 318 also provides a summary of the objects associated with each of the maps.

The map summary section 318 includes two portions, an expanded portion 320 and a collapsed portion 322. The expanded portion 320 provides a detailed summary of the contents of the map entitled "Wedding Planner." The collapsed portion 322 provides a collapsed (or abbreviated) summary of the contents of other maps that the user has created, such as "Example Map 2," "Example Map 3," and so on. The user interface 300 allows the user to activate one of the maps in the collapsed portion 322, causing the user interface 300 to summarize the selected map in the expanded portion 320 (instead of the collapsed portion 322); in complementary fashion, this operation also causes the map that was previously featured in the expanded portion 320 to now be summarized in the collapsed portion 322.

The expanded portion 320 presents two sub-portions of information regarding a map. A first sub-portion 324 of the expanded portion 320 presents overview information regarding the map 304. For instance, the first sub-portion 324 indicates that the map 304 currently has a status of "Password Protected," meaning that a person can access the map, providing that he or she inputs a valid password. The first sub-portion 324 also provides user interface elements through which the user can enter commands that affect the map 304. Such user interface elements can include:

- A first user interface element allows the user to set a password. The password allows the map 304 to be accessed by a group of users that happen to know the password.
- A second user interface element allows the user to set a default depiction of the map 304. The default depiction governs the view and scale of the map 304 that is presented to the user when the user initially activates the map 304. The user may set the default depiction of a map by adjusting the scale and view of the map as desired, and then activating the illustrated "Set View" command.
- A third user interface element allows the user to rename the map 304 (e.g., by changing the name "Wedding Planner" to some other name).
- A fourth user interface element allows the user to remove a previously selected password for the map 304.
- A fifth user interface element allows the user to instruct the MPF 102' to un-publish the map 304 (thereby revoking a previous instruction to publish the map). In one exemplary implementation, the MPF 102', by default, maintains a created map as a private map, accessible only to the author of the map.

The first sub-portion 324 can include yet additional high-level information pertaining to the map 304 and/or can include other commands that allow the user to interact with the map 304.

A second sub-portion 326 of the expanded portion 320 provides an overview of objects that have been added to the map 304. Namely, the second sub-portion 326 lists the names of the objects that have been added to the map 304, as previously defined by the user using the annotation section 310. Although not shown, the user can activate any object that is listed in the second sub-portion 326, which prompts the user interface 300 to provide additional information regarding the salient characteristics of the identified object. (For instance, FIG. 12, to be discussed in turn, shows a state of the second sub-portion 326 after the user has clicked on the object entitled "Sally.")

The sequence of FIGS. 3-5 provides further detail regarding the user interface 300 in the context of a particular use scenario. To facilitate understanding, the explanation of FIGS. 3-5 will forego the generic use of the term "user" in favor of the more specific terms "author-user" and "end-user." An author-user is a user who creates some feature of the map 304, such as by linking an object to the map 304. An end-user is a user who utilizes the map 304, but does not modify it. Of course, it will be appreciated that an end-user can also be an author-user. Further note that the scenario shown in FIGS. 3-5 is entirely exemplary; Section B (below) will describe many more applications.

In the illustrated scenario, an author-user has created an annotated map 304 for use in coordinating wedding-related activities. That is, the author-user intends the map 304 to serve as a hub of information for access by any end-user who will attend the wedding. As such, the author-user may create the map 304 as a password-protected map and then notify the guests of a password that can be used to gain access to the map 304.

Beginning with FIG. 3, assume that the wedding is being held in the state of Washington, and more specifically, in the city of Spokane. Assume that the author-user sets the map 304 up such that, when first activated, the map 304 shows a depiction of the entire state of the Washington. Since many of the guests are expected to travel to Washington from other parts of the country, the author-user may append a document-type object to the map 304 that provides directions to the wedding site. More specifically, as the wedding is being held in Spokane, the author-user can attach the document-type object to the map 304 in proximity to the city of Spokane. The user may access the directions by clicking on a visual item 306 that represents the document-type object.

Recall from the above explanation that the expanded section 320 of the user interface 300 reveals that the map 304 includes many associated objects, not just the document-type object represented by visual item 306. However, the author-user has set up the map, using the ZC module 126, so that certain objects are displayable at certain respective ranges of zoom levels. In the present case, the only object that is displayable at the state-wide level is the document-type object, associated with the visible item 306. The ability to selectively display objects at predetermined zoom levels is desirable, as it allows the author-user to avoid cluttering the map 304 with detail that may not be useful at certain zoom levels. The user interface 300 can allow the author-user to custom-define the range of displayable zoom levels in a manner set forth below in greater detail.

Assume that an end-user wedding guest gains access to the map 304 at the default state-level, and then subsequently navigates to a local view of the city of Spokane. This navigation operation can be achieved in conventional fashion by changing the view and scale of the map 304. As a result of these operations, the end-user advances to the depiction of the map 304 shown in FIG. 4.

The depiction of FIG. 4 shows a street-level depiction of the city of Spokane. Note that the expanded depiction of the map 304 in FIG. 4 includes various visible items that were not presented in the state-level depiction shown in FIG. 3. These visual items represent corresponding objects that have been attached to the map 304 by the author-user. The exemplary visual items and associated objects are summarized as follows.

- A first visual item 402 is an icon-type object that represents the location of a site where the wedding will be held. This object (i.e., a house icon) can be added by activating an icon command in the annotation section 310. The icon-type object is accompanied by an alphanumeric-type object (a label that reads "The Wedding Site") which can be added by activating an alphanumeric labeling command in the annotation section 310.
- A second visual item 404 is a media-type icon that represents a media-type object, in this case an audio file. The media-type object may present snippets of songs that the bride and groom have selected to be played at the wedding ceremony. This media-type object (the audio file) can be added by activating a media command in the annotation section 310.
- A third visual item 406 is another icon-type object that represents the location at which the reception is being held. The icon-type object is accompanied by an alphanumeric-type object (a label that reads "The Reception").
- A fourth visual item 408 represents a path-type object, describing a route from the wedding site to the reception site. The path-type object is constructed as several path segments, defined by path nodes (1) through (5). The path-type object can be added by activating a path creation command in the annotation section 310.
- A fifth visual item 410 represents a link-type object. In this case, the link-type object directs the end-user to a bridal registry website. In other words, an end-user can access this website by clicking on the hypertext link provided by in the visual item 410. The link-type object can be added by activating a web link command in the annotation section 310. The visual item 410 associated with the link-type object is accompanied by another icon-type object, which may represent the location of the house at which the bride's parents reside.
- A sixth visual item 412 represents another icon-type object, this time representing a location of a motel at which many guests are invited to stay. The author-user can add this icon-type object by activating the icon command in the annotation section 310.
- A seventh visual item 414 represents an image-type object that can be revealed by clicking on the visual item 414. The image-type object can be added by activating an image command in the annotation section 310. The visual item 414 is accompanied by an alphanumeric-type object (the label "Sally") that can be input via the alphanumeric label command in the annotation section 310. The label describes the image-type object.
- Finally, an eighth visual item 416 represents a document-type object that can be accessed by clicking on the item 416. The document-type object may provide a menu for a local restaurant.

FIG. 5 shows an example of the user interface 300 after the end-user activates one of the objects shown in FIG. 4. Namely, in the scenario shown in FIG. 5, the end-user has clicked on the visual item 414, which is associated with an image-type object. This user action prompts the user interface 300 to present an overlaid window 502 that shows a picture of the bride, Sally.

To reiterate, the scenario developed above is entirely exemplary. As reflected by the explanation provided in Section B, the MPF 102' can be applied to a myriad of other applications.

A.2. Exemplary Tools for Annotating Maps

Having set forth certain introductory features regarding the composition of the system 100 and its associated user interface presentation 300, the following discussion provides additional details regarding individual tools in the collection of annotation tools 110.

A.2.1. Tools for Manually Annotating Maps

Figure 6:
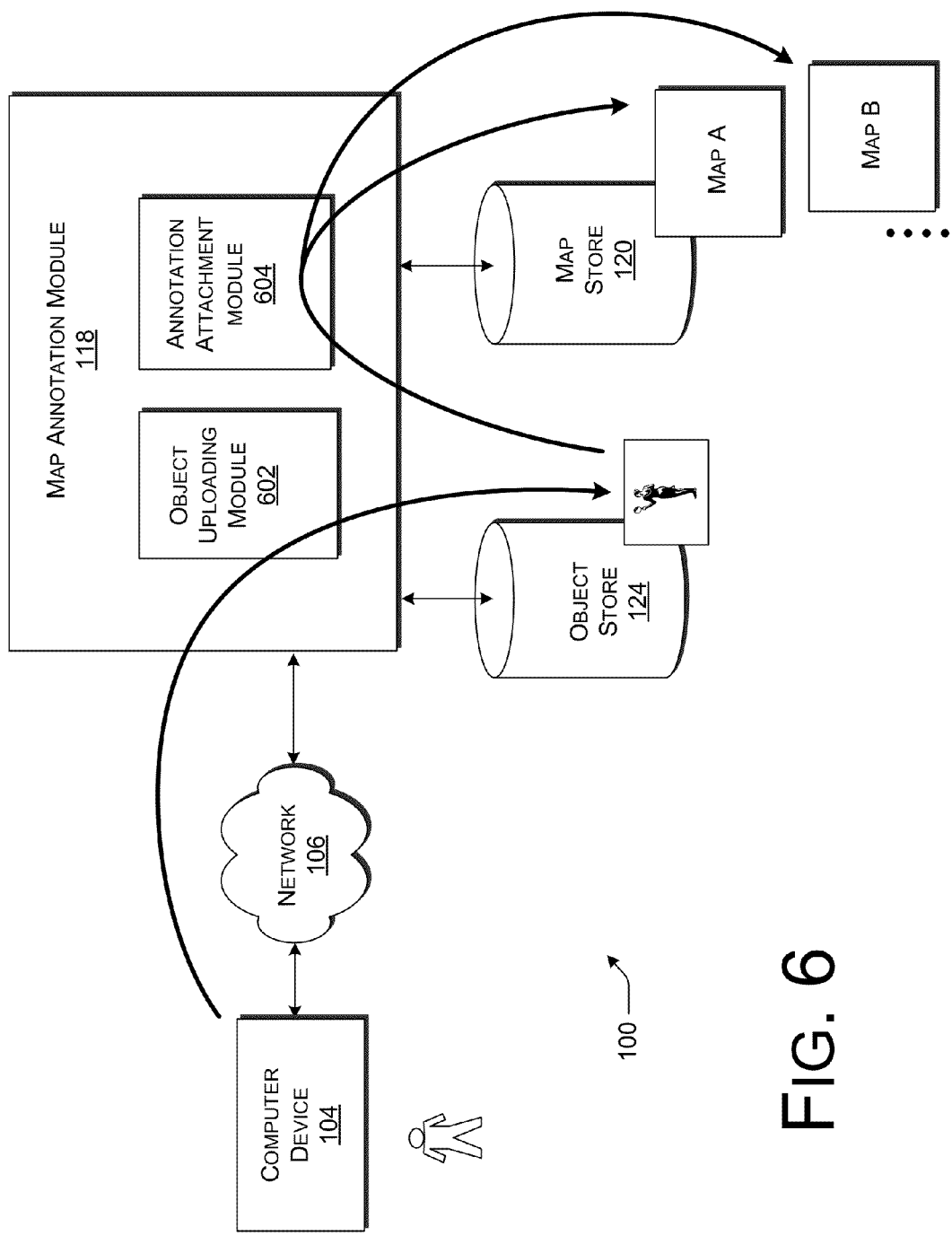
FIGS. 6-10 show features of an exemplary annotation module for use in the system of FIG. 1.

FIGS. 6-10 provide further details regarding the annotation module 122. To begin with, FIG. 6 shows a first version of the annotation module 122, where the annotation module 122 is configured to allow a user to manually upload objects (document-type objects, image-type objects, media-type objects, etc.) to the object store 124, and then link the objects to a map. Although not shown, the manual mode of annotation also allows the user to link other objects (icon-type objects, alphanumeric-type objects, path-type objects, link-type objects, etc.) that do not need to be uploaded to the object store 124.

More specifically, the first version of the annotation module 122 includes an object uploading module 602. The purpose of the object uploading module 602 is to upload a user-selected object to the object store 124. The annotation module 122 also includes an annotation attachment module 604. The purpose of the annotation attachment module 604 is to link an uploaded object to a map that is stored in the map store 120.

As pictorially presented in FIG. 6, a single object stored in the object store 124 can be linked to two or more maps, such as Map A and Map B. This provision is advantageous because it reduces the processing and storage burdens placed on the system 100, and it may also result in a better user experience for the user (who does not have to perform redundant uploading operations to add an object to multiple locations within a single map or various locations in multiple different maps).

Figure 7:
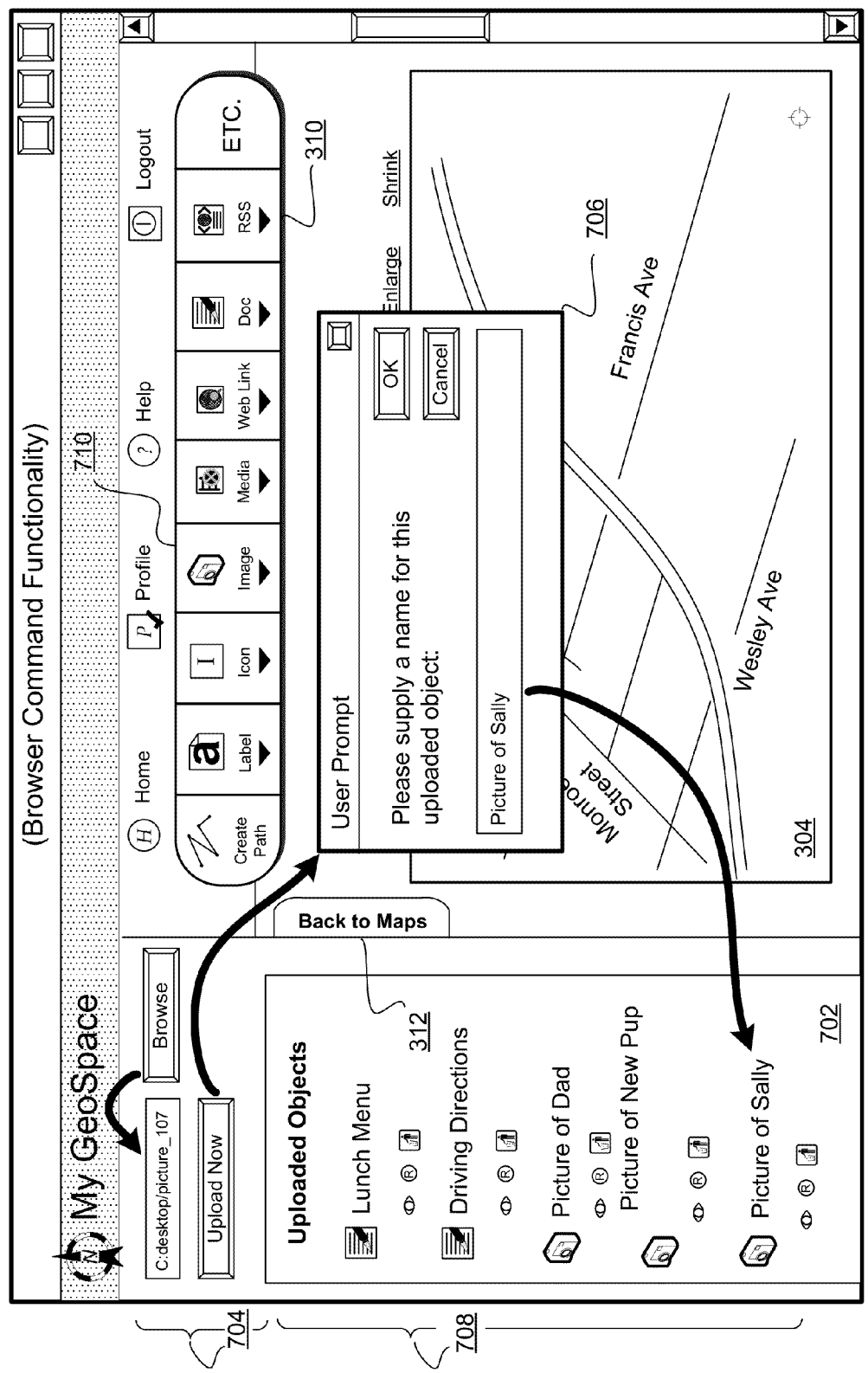
Figure 8:
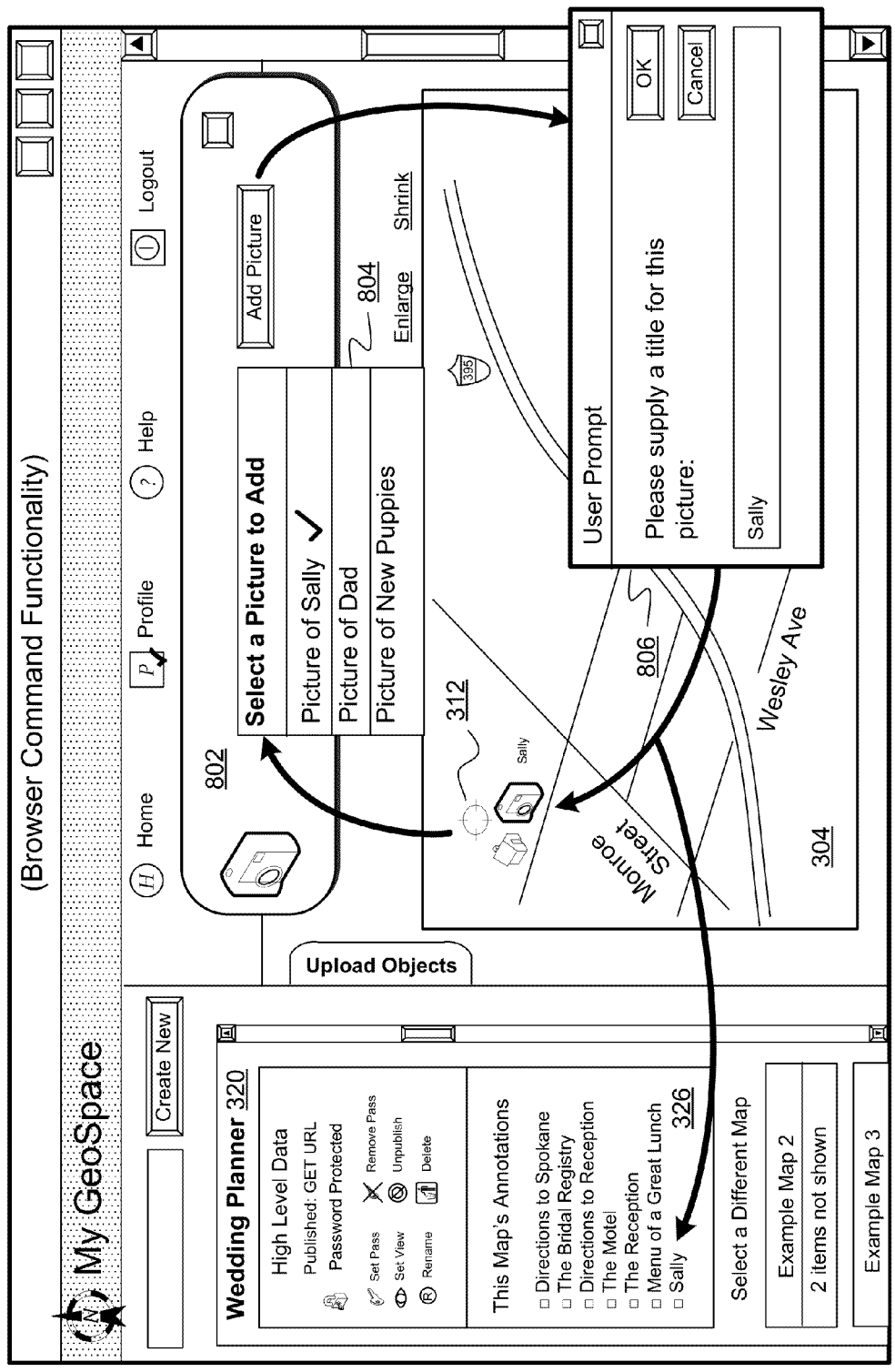
Figure 9:
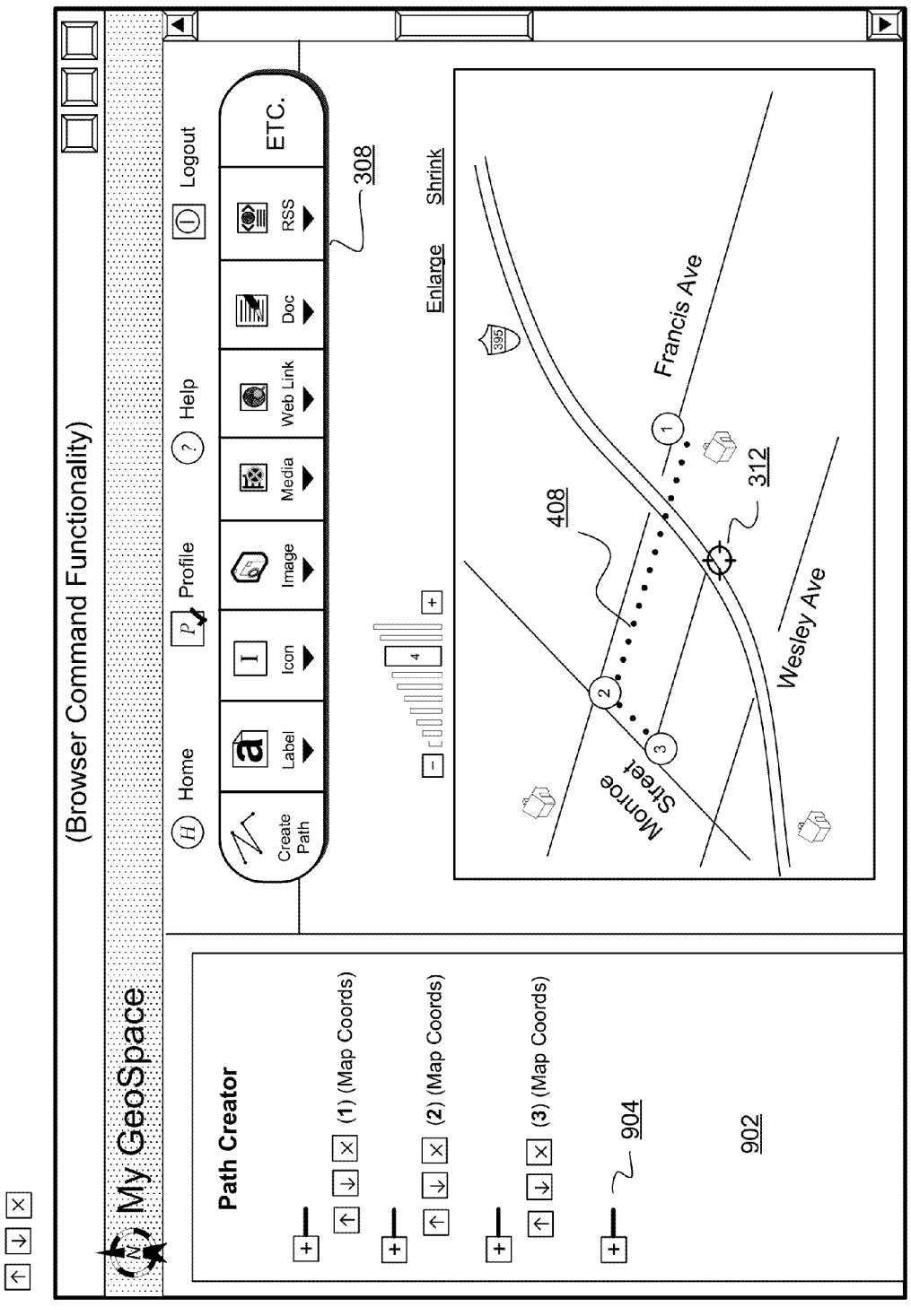

FIGS. 7-9 show a sequence of presentations provided by the user interface 300 that illustrate the first version of the annotation module 122. In this sequence, the user uploads an image-type object in the form of the digital photograph to the object store 124 using the object uploading module 602, and then attaches the image-type object in the object store 124 to the map 304 using the annotation attachment module 604. In the capacity discussed here, the user is an author-type user, referred to for brevity as just a "user."

Starting with FIG. 7, the user can activate the object uploading module 602 by clicking on the tab 312. This activates an object-upload user interface 702. The object-upload user interface 702 includes two portions. A first portion 704 allows the user to browse through a collection of objects and select a desired object for uploading. The browsing operation is initiated by activating a Browse command. As a result of the browsing operation, the user in the specific scenario shown in FIG. 7 has selected an image-type object stored on the client device 104 as "C:desktop/picture_107." The user can initiate the actual uploading process by activating an "Upload Now" command. This action prompts the object uploading module 602 to present a user prompt 706. The user prompt 706 asks the user to provide a label for the uploaded image-type object. This label defines the title of the image-type object in the object store 124.

A second portion 708 presents a list of objects stored in the object store 124. The user has selected the caption "Picture of Sally" in response to the user prompt 706. Accordingly, the listing in the second portion 708 shows, as the last entry, the caption "Picture of Sally." Each entry in the listing also includes supplemental icons. These icons activate commands when the user clicks on the icons. A first command allows the user to view the associated object. A second command allows the user to rename the object. A third command allows the user to delete the object.

Advancing to FIG. 8, this presentation of the user interface 300 allows the user to activate the annotation attachment module 604 so as to attach the uploaded image-type object to the map 304. The user initiates this procedure by first moving the position indicator 312 to a location in the map 304 at which the user wishes to attach the image-type object. The user can perform this task by moving the position indicator 312 using a mouse-type device in conventional fashion.

The user next clicks on the "Image" command 710 in the annotation section 310 (shown in FIG. 7). This prompts the annotation attachment module 604 to activate a specialized image annotation portion 802 (shown in FIG. 8). The image annotation portion 802 allows the user to display a list 804 of image-type objects that can be attached to the map 304 (wherein these image-type objects have been previously uploaded by the user according to the procedure described above with reference to FIG. 7). The user selects the image-type object labeled as "Picture of Sally" to attach to the map 304 at the location defined by the position indicator 312. The user can initiate the actual linking process by activating an "Add Picture" command in the image annotation portion 802.

In response to clicking the "Add Picture" command, the annotation attachment module 604 generates a user prompt 806. The user prompt 806 instructs the user to select a name for the image-type object. This defines the name that will appear in the expanded summary sub-portion 326 in the left-hand part of the user interface 300, which lists all of the objects that have been attached to this particular map, entitled "Wedding Planner." In this case, note that although the photograph of Sally is stored in the object store 124 as "Picture of Sally," the user has labeled the image-type object for purposes of the expanded summary sub-portion 326 as simply "Sally."

As stated above, the user interface 300 allows the user to add other objects (alphanumeric-type objects, iconic-type objects, etc.) to the map 304 without previously uploading these objects to the object store 124. Otherwise, the annotation procedure for other types of objects is similar to the operation outlined above for the image-type object. That is, in general, the user first selects a location in the map 304 by moving the position indicator 312 to a desired position in the map 304. The user next activates an appropriate command in the annotation section 310, corresponding to the type of object which the user intends to attach to the map 304. The annotation attachment module 604 then asks the user to supply a label (e.g. a title) for the object.

A.2.2. Special Provisions for Adding a Path-Type Object to a Map

FIG. 9 shows a special procedure for annotating the map 304 with a path-type object, such as the path-type object 408 that traces a course from the wedding site to the reception site. As described, a path-type object is characterized by multiple legs. The annotation module 122 creates the path-type object by allowing the user to successively specify endpoints of the path's legs, defined by a collection of path nodes.

More specifically, with reference to FIG. 9, the user initiates the path-creation process by activating the "Create Path" command in the annotation section 310. This prompts the annotation module 122 to provide a path creation user interface 902. In its initial state, the path creation user interface 902 includes a single "+" icon, representing an invitation for the user to select a starting node of the path-type object. In response, the user moves the position indicator 312 to define the starting node of the path-type object and then clicks on the first (and only) "+" icon in the path creation user interface 902. This action prompts the annotation module 122 to label the initial path node in the map 304 with the numeral "1," and then add a second "+" icon below the first "+" icon in the path creation user interface 902. The second "+" icon serves as an invitation for the user to select a second path node in the path-type object, representing the endpoint of a first leg of the path-type object. The user performs this function in the same manner described above for the first path node, namely by moving the position indicator 312 to a desired location and then clicking on the second "+" icon. Once a leg of the path-type object has been specified, the annotation module 122 can draw this part of the path-type object using a visibly discernable line segment. In FIG. 9, the path-type object 408 traces a route using a dotted line.

The above-described procedure can be repeated as many times as required until the user has defined the complete course of the path-type object. In the exemplary state of user interaction shown in FIG. 9, the user is in process of adding a fourth path node to the map 304, having positioned the position indicator 312 to a desired location of the fourth path node. It remains to simply click on a fourth "+" icon 904 to formally add the fourth path node to the map 304.

The path creation user interface 902 may include additional icons associated with other path-related operations. The user may invoke these operations by clicking on these icons. More specifically, the icons having the up and down arrows (↑, ↓) allow the user to adjust the order of path nodes that define the path-type object, that is, by respectively moving a selected path node ahead in the sequence of path nodes, or behind in the sequence of path nodes. This operation therefore redefines the shape of the path-type object. An "X" icon allows the user to delete a path node in the path-type object.

In another implementation, the system 100 does not require the user to manually specify position information. Rather, the system 100 can automatically extract position information based on, for example, GPS data. For instance, assume that the user takes several pictures while on a vacation and that the camera that is used is equipped with a GPS-registering mechanism. In this case, the GPS data and time data (indicating the order in which the photographs were taken) can be extracted to automatically reconstruct the user's route while on vacation. The system 100 can display the path in the same manner described above, e.g., as a series of line segments. Moreover, the system 100 can automatically annotate the path with the pictures that were taken while on vacation.

A.2.3. Tools for Automatically Annotating Maps

Figure 10:
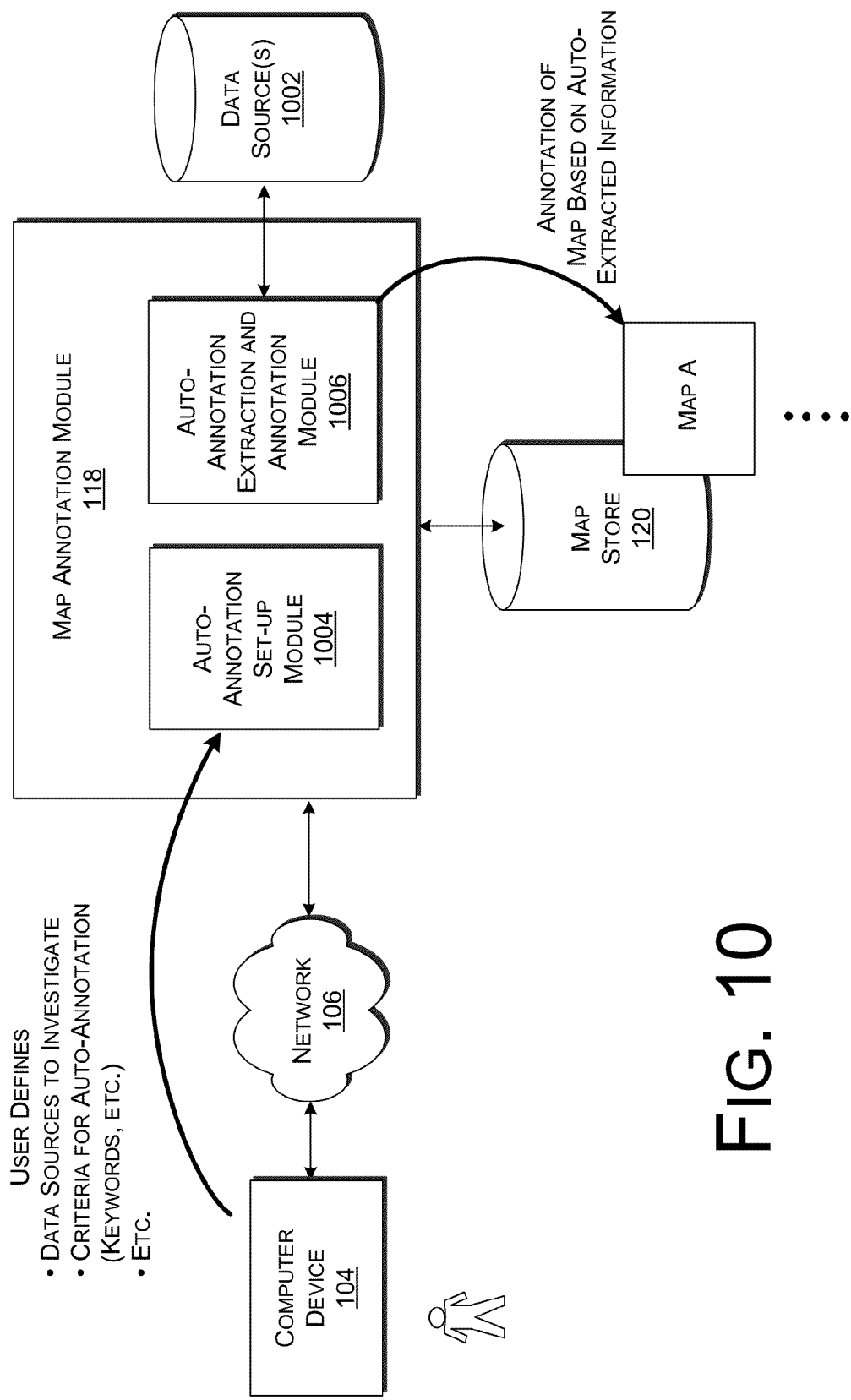

Now turning to FIG. 10, this figure shows further details of a second version of the annotation module 122 designed to automatically (instead of manually) add objects to a map in the map store 120. That is, this version of the annotation module 122 is configured to automatically cull objects from at least one data source 1002 that meet some specified criterion (or plural criteria), and then automatically add the culled objects to the map 304.

The annotation module 122 includes an annotation set-up module 1004. The purpose of this module 1004 is to collect information from the user which will govern the automated operation of the annotation module 122. A first piece of information allows the user to optionally specify at least one data source 1002 that is to be mined for objects. In one exemplary (but non-limiting) application, the user may select an RSS news-related feed data source as the data source 1002. Such a data source 1002 can provide news stories structured in the XML format. However, the user can select any other type of data source, expressed in any kind of format.

A second piece of information that the set-up module 1004 can collect specifies at least one criterion that will define whether an object in the data source 1002 matches the user's interest, thus indicating that the matching object should be added to the map 304. This input information can take various forms. In one exemplary implementation, the user may specify a key term that defines a subject of interest. For example, suppose that the user is interested in tracking news stories about the threat of bird flu. The user can first select a data source 1002 that is likely to feature news about the topic of bird flu. (Or the user can select plural data sources, such as a family of databases that feature news related to medical topics). Then the user may specify a key term of "bird flu." Assuming that the user is primarily interested in the incidence of bird flu in North America, the user may also enter the search term of "North America."

The annotation module 122 includes an automatic-annotation extraction and annotation module 1006, shortened to "auto-extraction module" for brevity. This module 1006 extracts objects from the data source 1002 and adds the extracted objects to the map 304 at appropriate positions. More specifically, this module 1006 can operate by periodically scanning the data source 1002 to determine if the data source 1002 includes any content that matches the selection criterion (or criteria) input by the user. This investigative function can be performed by determining whether any news stories in the data source 1002 includes alphanumeric content that matches a key term specified by the user. In other cases, the auto-extraction module 1006 can apply other kinds of rules and heuristic considerations in determining whether objects in the data source 1002 match the user's interests.

Having identified an object that matches the user's interest, the auto-extraction module 1108 next links the object to the map 304 at an appropriate position. To perform this function, the auto-extraction module 1006 determines where to place the object. One way of performing this task is to examine a news story to determine if it contains any reference to a geographical location, such as by including the name of a country, province, state, city, region, and so forth. The auto-extraction module 1108 can apply various rules and heuristic considerations to identify the location-based content of a news story. For example, the byline of the news story may or may not pertain to the actual geographic location being discussed in the story. A rule can thereby be applied to appropriately discount the occurrence of a geographic term in the byline of a news story. According to another rule, the auto-extraction module 1006 can add points to a relevance-related score if a geographic entry appears repeated times in the body of a new story. In certain situations, a news story may prominently identify two or more locations, such as in the case of a story that describes tensions between two countries. In this case, the auto-extraction module 1008 can optionally link the story to two different locations on the map 304.

After determining the location of the object, the auto-extraction module 1006 can link the object to the map 304 at an appropriate location.

According to another feature, the auto-extraction module 1006 can also assess the relevance of an object that matches the selection criterion. The auto-extraction module 1006 can assess relevance in any manner, such as by determining whether the object (such as a particular news story) is popular, as reflected by the fact that a large number of people have accessed it. To be more explicit, the inference being made here is that a popular object is also a relevant object. In another case, the auto-extraction module 1006 can infer that an object is relevant based on how strongly it correlates with a specified search term (e.g., based on the number of times that the search term appears in a news story), and so on. Still further mechanisms for assessing relevance can be used, or any combination of mechanisms can be used.

The auto-extraction module 1008 can then present an object in the map 304 in a manner that is related to the assessed relevance (e.g., relative rank) of the object. For instance, the auto-extraction module 1006 (in conjunction with the ZC module 126) can display a highly relevant object so that it is visible over a wider range of zoom levels compared to a less relevant document. In another case, the auto-extraction module 1006 (in conjunction with the ZC module 126) can display each object so that it appears at the most appropriate zoom level (or zoom levels), but the auto-extraction module 1006 (in conjunction with the ZC module 126) may otherwise assign each object the same range of zoom levels. For example, a story about a federal tax program may be displayed over 5 zoom levels in which the entire country is generally in focus in the map 304. On the other hand, a story about an ordinance that may affect a local community may be displayed over 5 zoom levels in which the community is generally in focus in the map 304. In another case, the auto-extraction module 1006 (in conjunction with the ZC module 126) can combine the features of the first two cases, such that the auto-extraction module 1006 (in conjunction with the ZC module 126) determines, based on relevance, both: (a) an appropriate range of zoom levels; and (b) a zoom level at which the range is centered on. Still other strategies can be used to govern the display of objects based on their respective relevance.

The annotation module 122 can use other techniques (rather than the selection of zoom levels) to emphasize (or deemphasize) certain objects. For example, the annotation module 122 can proportionally increase the size of visual items on the map 304 to suit the relative importance of the corresponding objects, change the level of transparency or color of the visual items to convey relevance, add descriptive icons or other information to convey relevance, and so on.

The above-described procedure was explained in the specific context of news-related content. However, a similar procedure can be applied to other types of content. For example, the user can apply the above-described procedure to examine an auction-related database, such as a database provided by EBay, Inc., of San Jose, Calif. That is, for example, the user can identify the EBay database as a data source in conjunction with a keyword "Rolex" as a selection criterion. The procedure can examine the database, identify all auctions that involve the sale of a Rolex watch, identify the regional affiliations of these auctions (e.g., which may correspond to the locations of the sellers), and then automatically annotate a map to show the identified locations.

Moreover, the annotation module 122 can automatically annotate a map based on other auto-annotation paradigms. For example, the annotation module 122 can employ a "spider" program to troll the web to identify websites that provide content having a certain character, such as, in one case, websites that are dedicated to providing news content. The annotation module 122 can then examine the nature of each website to determine whether it has a regional affiliation. For example, an RSS news feed associated with the Miami Herald includes content that emphasizes news that is particularly pertinent to southern Florida. Based on this determination, the annotation module 122 can annotate a map with links associated with the different websites. The end-user may click on any link as a convenient means of discovering content that is pertinent to a particular region. Moreover, the above-described procedure can be applied to other types of websites. For example, the annotation module 122 can identify websites that feature information regarding a recreational activity, such as surfing, and then place these websites on a map based on their regional affiliations (if, in fact, the websites exhibit regional affiliations).

In yet another variation, the user can initiate the geo-location of a news story on a more fine-grained story-based level. For example, the user can click on an individual news story, causing the annotation module 122 to perform location-based analysis on this specific news story. If the news story has a regional affiliation, the system 100 can place the news story on a map at an appropriate position (e.g., by displaying an icon or a link to the story at the appropriate position).

A.2.4. Tools for Setting Zoom Level

Figure 11:
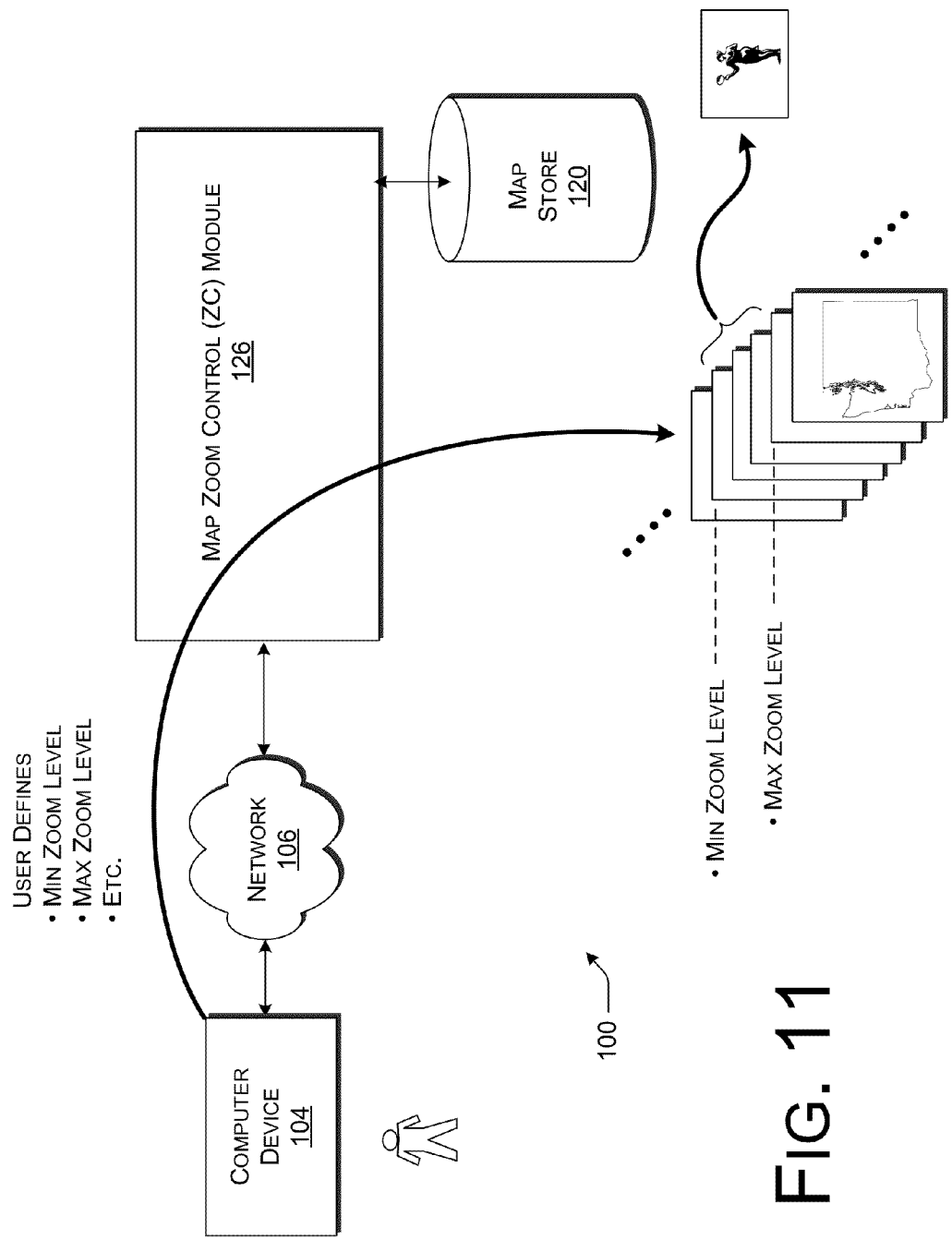
FIGS. 11 and 12 show features of an exemplary zoom control module for use in the system of FIG. 1.
Figure 12:
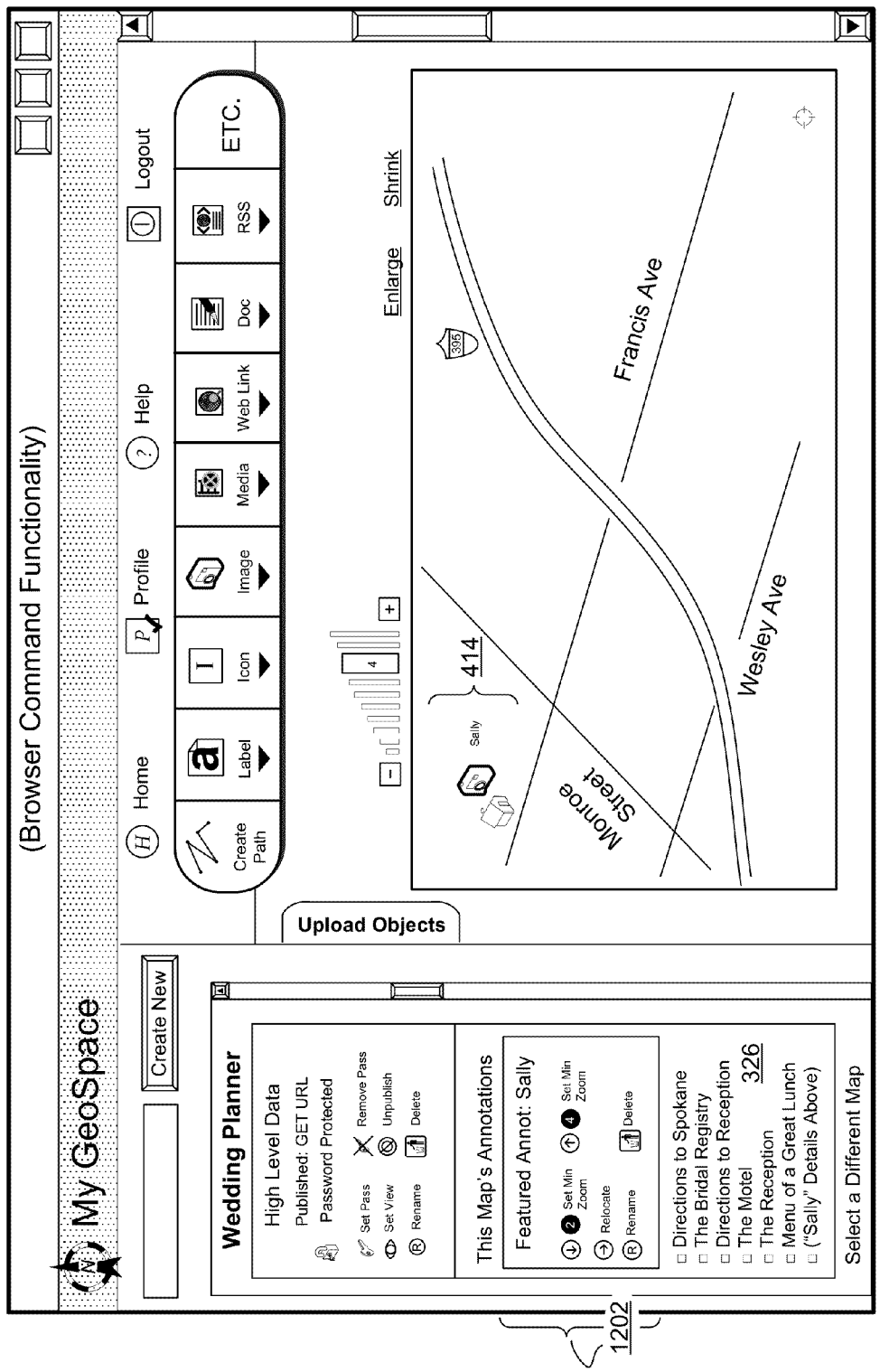

FIGS. 11 and 12 show further details regarding the zoom control (ZC) module 126. As stated, the purpose of the ZC module 126 is to allow the user to manually select a range of zoom levels over which an object is made visible. This feature is useful so as to not unduly clutter the map 304 with information that may not be relevant to the user. Recall from the discussion immediately above that the annotation module 122 can work in conjunction with the ZC module 126 to automatically select a range of zoom levels when automatically adding an object to the map 304. In contrast, the purpose of the ZC module 126 described in this subsection is to allow the user to manually select the zoom level range at which an object is made visible.

As shown in FIG. 11, the ZC module 126 accepts zoom selections from the user, including a minimum zoom level and a maximum zoom level. These zoom levels define the bounds of a range of zoom levels over which an object will be made visible in the map 304. To be more specific, if an end-user selects a zoom level that lies outside this range, the object will not be displayed (or at least will not be displayed in its complete form). If the user selects a zoom level that lies within the range, the object will be displayed. As explained above, an object is displayed by showing a visible item on the map 304 that is associated with the object.

FIG. 12 shows how the user interface presentation 300 can be used to implement UI-related aspects of the ZC module 126. In this figure, the user has clicked on the title of the object "Sally" in the expanded summary sub-portion 326 of the user interface 300. Recall that this object represents an image-type object (e.g., a digital photograph) of a person named Sally. Further recall that this object is represented by a visual item 414 (e.g., a camera icon) that appears in the map 304. Activating the object name "Sally" prompts the user interface 300 to display salient characteristics of this object in a featured panel 1202.

More specifically, the featured panel 1202 includes various icons that allow the user to enter various respective commands (by clicking on the icons). One command allows the user to select a minimum zoom level. Another command allows the user to select a maximum zoom level. Another command allows the user to relocate the featured object to another location in the map 304. Another command allows the user to rename the object. Another command allows the user to delete the object.

In the illustrated case, the user has selected a minimum zoom level of "2" and a maximum zoom level of "4." This means that the map 304 will display the visual item 414 (corresponding to a camera icon) for zoom levels of 2, 3, and 4, but not any other zoom level outside this range.

In one case, the ZC module 126 can control the selective display of objects based on both the minimum zoom level and the maximum zoom level. In another case, the ZC module 126 can control the selective display of objects based on either the minimum zoom level or the maximum zoom level. For example, if only the minimum zoom level is specified, the ZC module 126 can make the object visible for any requested zoom levels that equal or exceed the minimum zoom level.

A.2.5. Tools for Publishing and Sharing Maps

Figure 13:
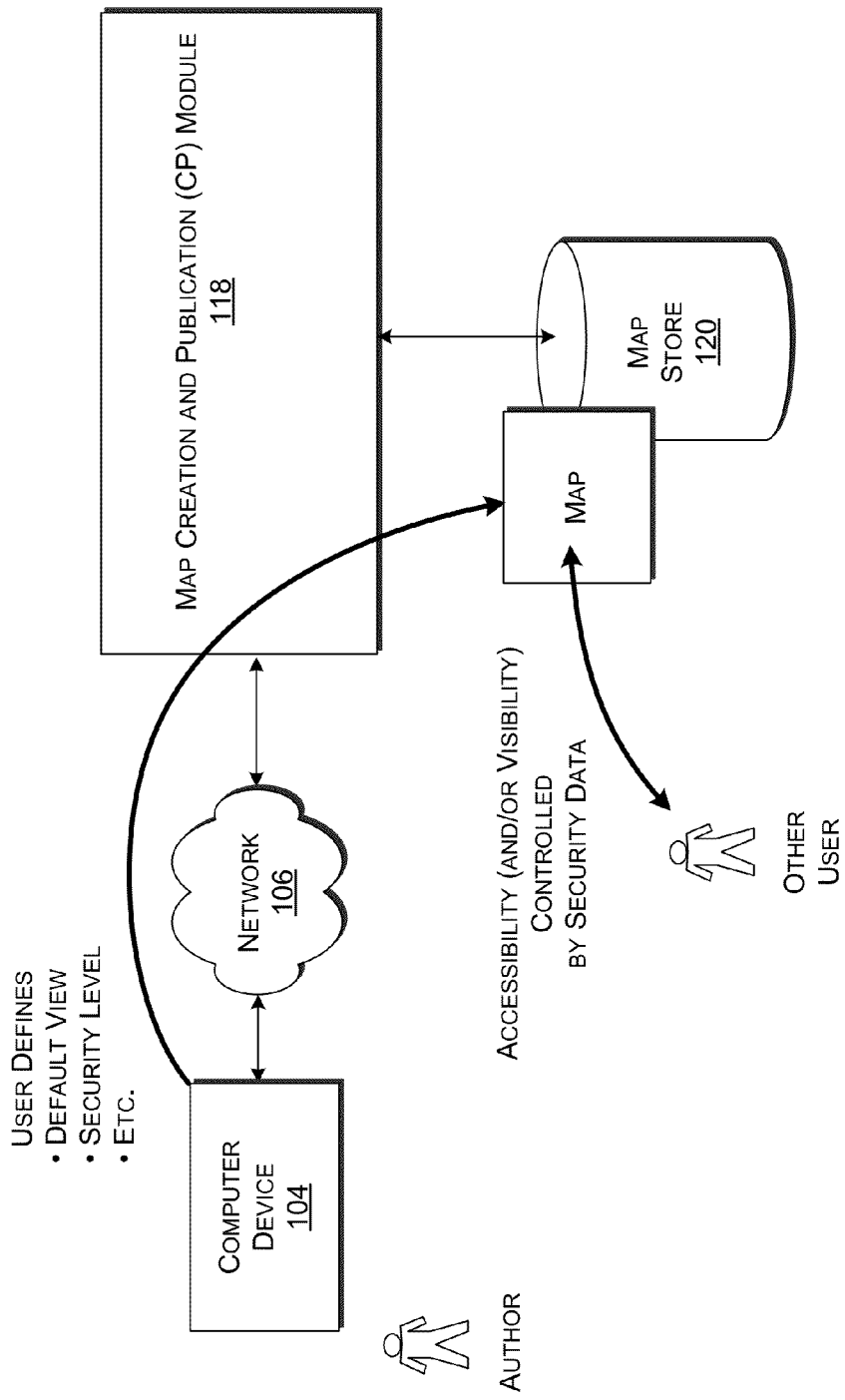
FIG. 13 shows features of an exemplary map creation and publication module for use in the system of FIG. 1.

FIG. 13 provides further details regarding the map creation and publication (CP) module 118. More specifically, the following explanation focuses primarily on the publication component of the CP module 118. As stated above, the purpose of this module 118 (as it pertains to publication) is to retain a created map in a form that can be optionally accessed by others.

The CP module 118 publishes a map by prompting the user to select one of a group of possible security options. A first security option allows the user to publish the map 304 without restriction, meaning that anyone in the general public can access the map 304. A second security option allows the user to publish the map 304 with a password, enabling only those who know the password to access the map. A third option allows only the author to access the map 304.

Still other security options are possible. For instance, the CP module 118 can give the user the option of assigning different security options to different actions that may be performed with respect to the map 304. For example, the user can select a security option that permits any person to access the map 304 without restriction. But the user can also select a security option that allows only a select group of users to modify the map 304. This selectivity can be achieved by requiring users to enter a valid password as a precondition to modifying the map 304.

In another implementation, the CP module 118 can optionally allow the user to attach security options on a more fine-grained level, such as by attaching access constraints to individual objects (as opposed to the map as a whole). For example, if a certain photograph is regarded as highly confidential, then the CP module 118 can prevent non-authorized users from accessing this photograph, even though the map as a whole may be registered as available for public consumption. In this case, the CP module 118 defines an object-level security constraint which overrides the map-level security policy.

In one exemplary implementation, the CP module 118 can register a map as private as a default rule. The user can then be allowed to remove this constraint by making the map open to the general public or by making the map password protected.

As a further feature, the CP module 118 can allow a first user to send a map to other users. The first user can perform this task by Emailing a link to the map to one or more other users, or by sending the link via an IM message, or by posting the link to a website, and so on. In another case, the CP module 118 can allow users to share maps through blogs, etc. These sharing provisions allow a social network to be formed around a map that is of common interest to a group of users.

A.2.6. Tools for Performing Map-Based Searching

Figure 14:
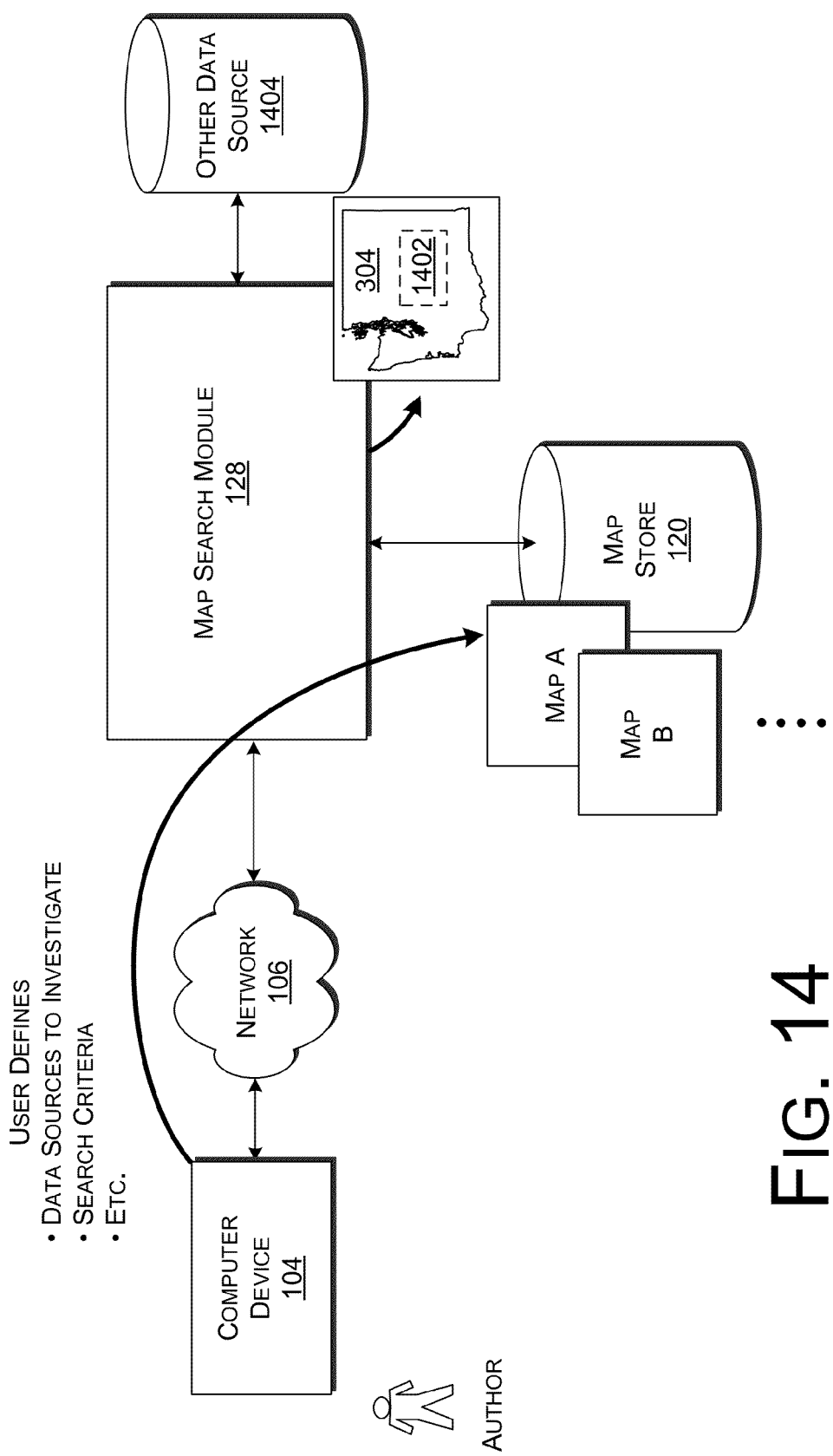
FIG. 14 shows features of an exemplary map search module for use in the system of FIG. 1.

FIG. 14 shows further details regarding the map search module 128. The general purpose of the search module 128 is to perform a search that relies on one or more annotated maps. The search module 128 can utilize the maps in different ways, some of which are identified below.

According to a first aspect of the map search module 128, this module 128 allows the user to perform a search for content within an individual map. For example, the map search module 128 can allow the user to define a bounding box 1402. The bounding box 1402 defines a region within the map 304 that is demarcated by the boundaries of the box 1402. The user can draw the bounding box 1402 on the map 304 in any manner, such as by performing a click and drag operation using a mouse device. (Alternatively, the map search module 128 can allow the user to define a bounding region of arbitrary shape, e.g., by drawing the boundary of this region in free-form fashion on the map 304 using the mouse device.) The map search module 128 can also allow the user to enter at least one selection criterion, such as a key term. In operation, the map search module 128 can then investigate the objects that may appear within the defined bounding box 1402 to determine whether these objects satisfy the selection criterion. If they do, the map search module 128 can convey this fact to the user in some manner, such as by presenting a list of the matching objects, or by highlighting the matching items on the map 304 itself.

For example, suppose that the user is looking for a used car in the eastern part of Portland, costing no greater than five thousand dollars. The user may enter search criteria which indicates the make of the car which she desires to purchase, as well a maximum amount of money she is willing to pay. The user may then draw the bounding box 1402 on the map 304 which identifies the desired part of Portland. The map search module 128 responds to these selections by determining whether there are any used cars in the specified region that meet the user's search constraints. The search module 128 can then notify the user of the results of the search.

As a variation of the above functionality, the user's selection criterion can identify a particular type of object that the user is looking for, such as an image-type object. Thus, the user in the above car-shopping scenario can optionally restrict the results to only those annotations that include a picture of a car being sold. Or the user may enter a selection criterion that specifies the type of object without specifying an alpha-numeric search term, and so on.

As another variation of the above functionality, the user can search an entire map for desired content, that is, without specifying a bounding box.

In another case, the user's selection of a bounding box 1402 is used in the actual formulation of a search term, and this search term is then applied to one or more data sources 1404 to extract relevant objects. For example, assume that the user is interested in discovering news stories that pertain to eastern Oregon. The user can first optionally select one or more relevant data sources 1404 that can be mined for the news stories. The user can then draw a bounding box 1402 on the map of Oregon to identify the eastern part of Oregon as a locus of interest. In response to the specification of the bounding box 402, the map search module 128 can search the data source(s) 1404 for any stories that pertain to eastern Oregon. It can perform this task by first automatically identifying search terms that are relevant to eastern Oregon, such as by automatically extracting the names of the cities in this region. The search module 128 can identify search terms using a predetermined lookup table, or by analyzing the contents of the selected part of the map 304 itself. The search module 128 then automatically determines whether any news stories contain the identified geographical search terms. The map search module 128 can present the outcome of its search in the manner specified above, e.g., by presenting a list of relevant items.

In yet another mode of operation, the search module 128 can allow the user to search through a database of maps created by one or more users. For example, fishermen may create individual maps to identify their favorite fishing locations within a particular state. Taken together, these maps represent a valuable source of information for anyone who is interested in catching fish of a particular type. For example, the user can enter the type of fish which she wishes to catch, along with the general region of interest. The search module 128 can mine the database of maps to provide site recommendations to the user. In a particular version of this approach, the user can view and/or search maps produced by specified authoring-users, e.g., by inputting the passwords or other identifying information associated with these users.

Still other search strategies can utilize annotated maps.

B. Exemplary Method of Operation (FIGS. 15-21)

FIGS. 15-21 describe the operation of the system 100 in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in prior sections, Section B will serve mainly as a review of those functions.

B.1. Operation of Core Tools

The following series of flowcharts describe the general operation of the tools 110 set forth in Section A. By way of preview, the next subsection (B.2) provides information regarding various applications of the tools 110.

B.1.1. Manual Annotation Procedures

FIG. 15 shows an exemplary procedure 1500 for manually linking an object to a map.

In step 1502, the system 100 optionally receives the user's instruction to upload an object, and then receives the actual uploaded object itself for storage in the object store 124.

In step 1504, the system 100 receives the user's indication of a location at which the object will be placed in the map.

In step 1506, the system 100 receives the user's instruction to link the object to the selected location in the map.

In step 1508, the system 100 receives the user's label assigned to the object to be linked to the map. This label serves as a reference title of the object.

In step 1510, the system 100 links the object to the specified location in the map.

As previously described, the system 100 can link other objects to the map without first uploading these objects to the object store 124.

B.1.2. Path Creation Procedures

FIG. 16 sets forth an exemplary procedure for allowing a user to create a path-type object. A path-type object is defined by multiple path nodes, where the path nodes define associated path segments.

In step 1602, the system receives the user's selection of a path node. This operation can be performed in the manner specified in the previous section, that is, by moving the position indicator 312 to an appropriate location within the map and then activating an add-node command (e.g., by activating a "+" icon).

Steps 1602 and 1604, taken together, convey that the user can repeat the above-described operation a number of times until the path-type object is fully specified.

In step 1606, the system 100 allows the user to define the title of the path-type object, which facilitates reference to the path-type object.

In step 1608, the system 100 formally links the path-type object to the map as a certain type of annotated object.

B.1.3. Automatic Annotation Procedures

Figure 17:
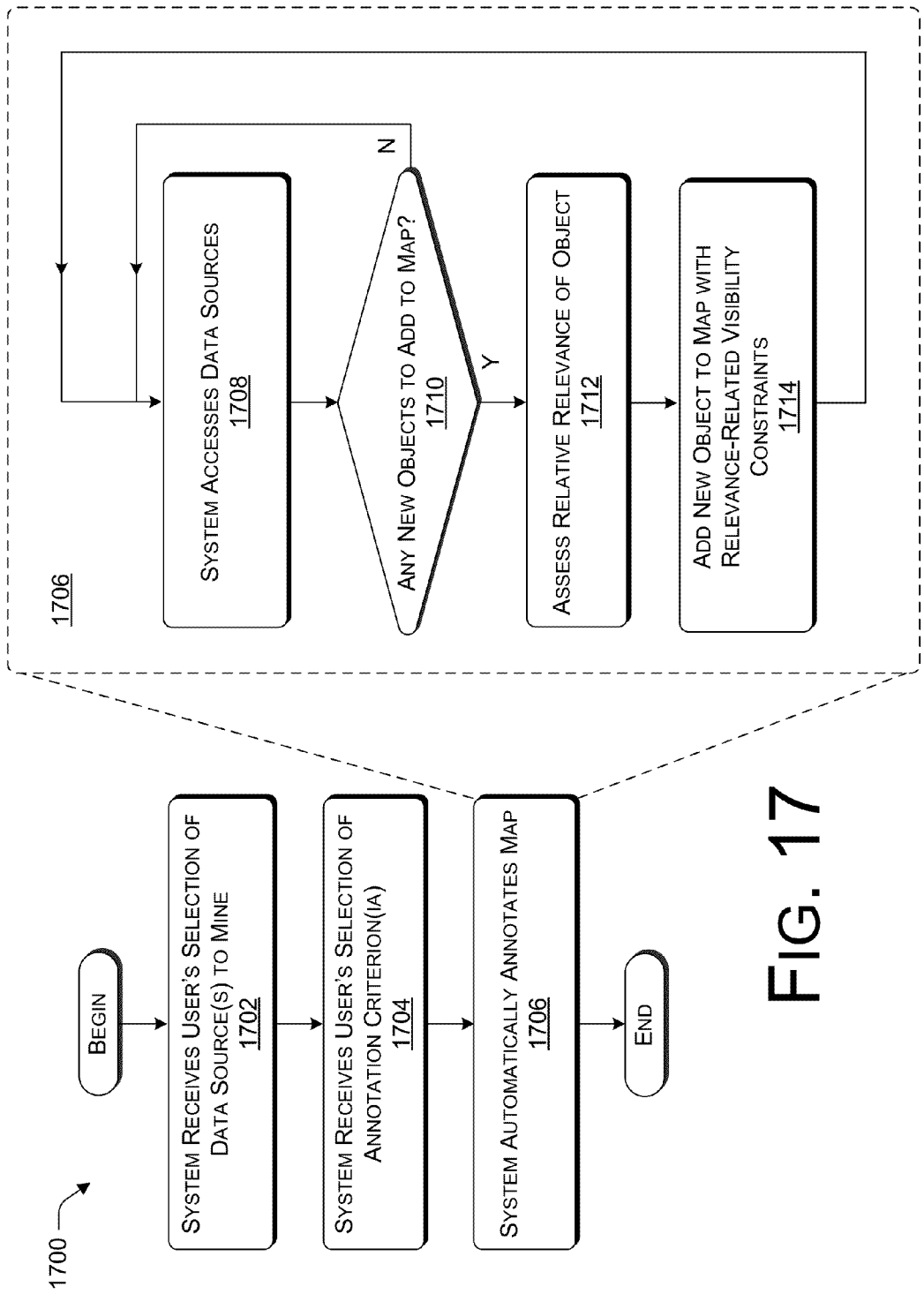
FIG. 17 shows an exemplary procedure for automatically annotating a map with objects extracted from a data source (such as an RSS feed data source).

FIG. 17 shows an exemplary procedure 1700 for automatically selecting objects from a data source (or plural data sources) and linking the objects to a map.

In step 1702, the system 100 optionally receives the user's selection of one or more data sources to mine for objects. In an alternative implementation, instead of narrowing the search to an expressly identified data source, the procedure can perform a more open-ended search, such as by using a spider program to automatically identify a relevant data source (or sources).

In step 1704, the system 100 receives the user's specification of at least one selection criterion. A selection criterion defines conditions that should be met before an object is deemed to satisfy the interests of the user, enabling the object to be added to the map.

In step 1706, the system 100 automatically annotates the map based on the selections made in steps 1702 and 1704.

The right-hand portion of FIG. 17 elaborates on operations performed in step 1706. Namely, in step 1708, the system 100 accesses the selected data source(s).

In step 1710, the system 100 determines whether there are any new objects in the data source to add to the map. The system 100 performs this function by determining whether any new objects satisfy the selection criterion defined by the user.

In step 1712, the system 100 can optionally assess the relevance of any matching objects based on any relevance-determination paradigm or combination of paradigms.

In step 1714, the system 100 can add matching objects to the map. The system 1714 can tailor the display of the objects (or visual items that correspond to the objects) based on the respective relevancies of the objects. In one case, this allows objects that are deemed as relatively important to be displayed more prominently in the map compared to objects that are considered less important.

B.1.4. Zoom-Setting Procedures

FIG. 18 shows a procedure 1800 that sets forth a method for receiving the user's manual selection of a range of zoom levels.

In step 1802, the user specifies a minimum zoom level.

In step 1804, the user specifies a maximum zoom level.

Alternatively, or in addition, in step 1806, the system 100 can automatically define a zoom range based on an assessment of the relevance of an object in question.

In step 1808, the system 100 stores the zoom information, such as the minimum and maximum zoom levels.

FIG. 19 shows a procedure 1900 that sets forth a method for selectively presenting objects based on selected minimum and/or maximum zoom levels.

In step 1902, the system 100 receives the user's request to present a map at a selected zoom level.

In step 1904, the system 100 determines whether a particular object under consideration is visible at the selected zoom level. This is ascertained by determining whether the selected zoom level lies within a visible zoom range defined for this particular object. This operation is repeated for all objects linked to a map.

In step 1906, the system 100 displays an object based on the above-defined criterion.

Alternatively, in step 1908, the system 100 does not display the object because it does not satisfy the above-defined criterion.

B.1.5. Map Publication Procedures

Figure 20:
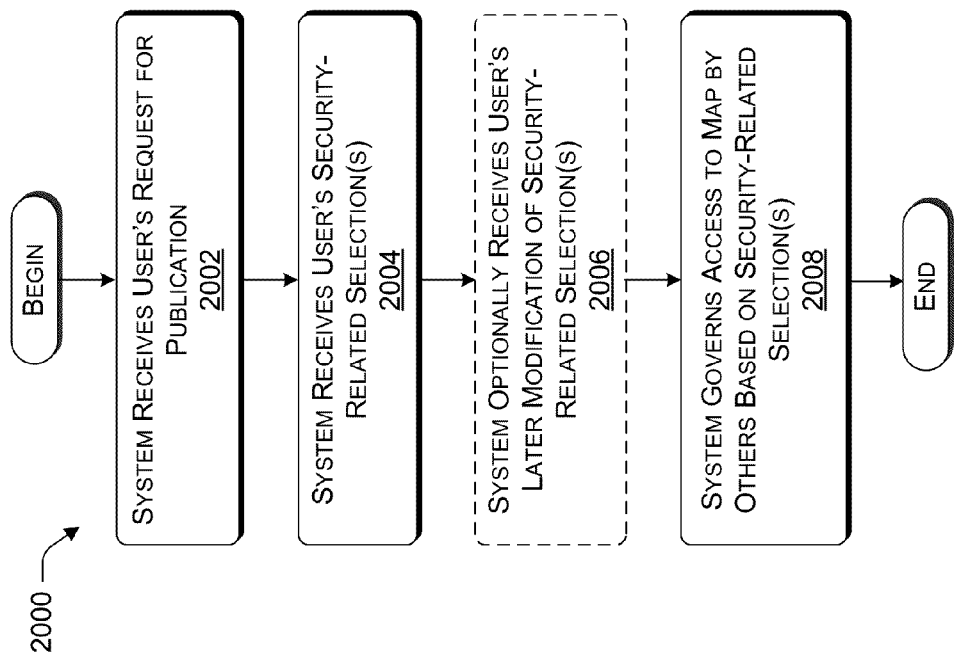
FIG. 20 shows an exemplary procedure for selecting a security level associated with a map and granting access to the map based on the selected security level.

FIG. 20 illustrated a procedure 2000 for publishing a map.

In step 2002, the system 1000 receives the user's request to publish a map. This request can be an implicit instruction based on the context of the user's interaction with the system or an express instruction.

In step 2004, the system 100 receives the user's selection of a security-related option, e.g., indicating whether the user wishes the map to be accessible by everyone without restriction, accessible to a group of users that know a password used to access the map, or accessible to no one but the author of the map.

In step 2006, the system 100 optionally allows the user to later modify the security option selected in step 2004. For instance, the user may originally established a non-public map or a password-restricted map, but subsequently desires to make map available to a wider group of users.

In step 2008, the system 100 potentially restricts access to the map based on the selected security option.

B.1.6. Map Searching Procedures

Figure 21:
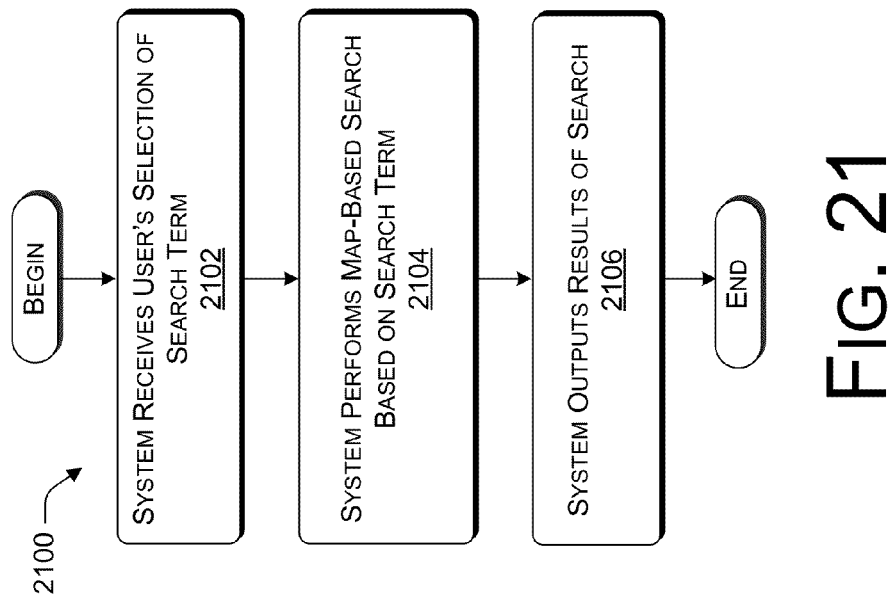
FIG. 21 shows an exemplary procedure for performing a search operation which involves the use of one or more user-created maps.

FIG. 21 shows a procedure for performing a search based on one or more previously created maps.

In step 2102, the system 100 receives the user's selection of a search term. This operation may involve receiving the user's selection of a region in a single map defined by a bounding box, in optional combination with one or more search terms. This operation may also (or alternatively) involve setting up a search of multiple maps, to determine whether the maps contain sought-after information. As explained above, still other map-based searching paradigms are possible; these paradigms may prompt the user to supply different kinds of input selections.

In step 2104, the system 100 searches one or more maps based on the input selections made in step 2102.

In step 2106, the system 100 outputs results of the search to the user.

B.2. Applications of Map-Annotating Functionality

Recall from the discussion of FIG. 1 that the system 100 can include multiple applications 112 that make use of the annotation tools 110. The following explanation provides several examples of the applications 112. The list of applications provided below is representative, not exhaustive.

B.2.1. Advertising-Related Procedures

The system 100 can allow advertisers to link advertising-related objects to a user's maps. In doing so, the advertiser can use the zoom control (ZC) module 126 to define the zoom levels at which the advertising-related objects are made visible. The selection of a visibility range for a particular object may depend on the characteristics of the product or service that is being advertised. For example, if the system 100 determines that an item being advertised has nation-wide appeal, then the system 100 can display a corresponding advertising-related object over a wide range of zoom levels, where such range encompasses nation-wide zoom levels. However, if the system 100 determines that the item being advertised has only local appeal, then the system 100 can display the associated advertising-related object over a more limited range of zoom levels, wherein such range encompasses locale-specific zoom levels.

Alternatively, or in addition, the system 100 can allow an advertiser to increase the exposure of an advertising-related object by paying additional advertising-related fees. For example, the system 100 can charge a first advertising fee for the presentation of an object over 5 zoom levels, a second (larger) advertising fee for the presentation of an object over 10 zoom levels, and so on.

Alternatively, or in addition, the system 100 can adjust an initially selected zoom range based on empirical data that reflects actual user consumption of an advertisement. For example, if the system 100 determines that it is more prevalent for users to click on an advertisement when presented at a state-wide zoom level rather than a local zoom level, the system 100 can more sharply focus the presentation of the advertisement to a range of state-wide zoom levels, rather than local zoom levels.

From an end-user perspective, the end-user can activate a particular depiction of a map by selecting a desired view and scale. In response, the user may receive one or more advertisements that the system 100 deems to be relevant to this particular map depiction. The advertisements can be linked to particular map content in different ways. In one exemplary implementation, the system 100 can govern the selection of advertisements based on the map coordinates of one or more features being shown in the selected map (such as the map coordinates of a particular city that is being shown). The triggering criteria can also take into account scale, as noted above, meaning that a map display that encompasses Spokane on a state-wide level may prompt the display of a first series of advertisements, while a map display that encompasses Spokane on a street level may prompts the presentation of a second series of advertisements.

B.2.2. Out of Office Notification

In another application, the system 100 can provide an Email notification to a message-sending user when the message-sending user sends an Email to a target user who happens to be "away from the office" at the time. The Email notification can display a map which shows the current location of the target user. For example, the target user may be visiting different cities on different days of a trip. The target user can create a map which provides a path-type object which plots the target user's planned trip route. The target user can then link this map the target user's out-of-office Email notification. Upon receipt, the map enables the message-sending user to determine where the target user is located when the message-sending user sends an Email to the target user. Such a map can be annotated with objects which provide contact information, such as the respective telephone numbers of the hotels at which the target user will be staying over the course of the trip.

In another implementation, the user can carry a GPS mechanism (or other position-determination mechanism) while on the trip. The GPS mechanism can forward location information to the map which indicates the current position of the user. In this case, the map can plot the path of the user based on the actual movements of the user.

B.2.3. Various Applications which Provide a Series of Maps for Different Time Slices In another genre of application, the system 100 can allow the user to link together several maps corresponding to different respective instances in time. The system 100 can allow the user to annotate each map in the manner defined above based on a particular theme of an application. For instance, in one such application, the user can generate a series of maps which show the spread of pollution in a certain region over time, with each map representing a depiction of the area at a particular point in time. Each map can be annotated with objects which represent pollution sources at a particular point in time, etc.

B.2.4. Community Collaborative Maps

Using the tools described above, the system 100 can provide a map that is accessible to a defined group of users (via a password protection mechanism) or to any individual without restriction. The system 100 can optionally allow the users to modify the map, such as by adding objects to the map, including photographs, documents, audio resources, etc. Through this provision, the map is effectively shared by plural users. And hence, the map at any point in time may represent the collaborative contribution of several users.

Consider one non-limiting example of a community map. Assume that certain users have a shared interest in a national park. A hosting author can create a master map of the park. The master map can show the general layout of the park, various attractions offered by the park, and so on. Users can individually annotate this master map by adding objects, such as photographs, paths, textual descriptions, and so forth. Alternatively, or in addition, the users can create personal maps and add links on the master map through which these personal maps can be accessed. Each of these personal maps can itself be annotated with various objects, such as photographs, paths, textual descriptions, and so forth. For example, assume that there are various idiosyncratic ways to climb to the top of a mountain in the park. A user can prepare a personal map that includes a path object that shows one route to the top of the mountain, along with pictures taken along the way, textual comments regarding obstacles that are likely to be encountered, and so on. The user can add this personal map to the master map by adding a link within the master map at an appropriate location, such as at the start of the route or at another location which best characterizes the route. The user can define whether or not this personal map should be made public using the tools described above. If the personal map is made public, other users will be able to access it via the master map.

As another feature, the system 100 can assess the relevance of objects created by different users. One way to perform this task is to determine how popular a particular object has proven to be, e.g., based on how many times users have clicked on the object (or otherwise activated the object) in the master map. The system 100 can select a zoom range for each object based on its relevance. For example, if a hiker has created a personal map which is popular among other hikers, then the system 100 can present a link to this map on the master map over a relatively wide range of zoom levels of the master map.

B.2.5. Miscellaneous Other Applications

A number of other applications are summarized below.

Fishermen can use the system 100 to create maps annotated with data collected from several different sources, such as tide-related information sources, weather-related information sources, and so on.

Travel agencies can use the system 100 to create maps for clients. The maps may include photos of interesting sites, menus of recommended restaurants, fare-based information, travel advisory information, recommended walking tour, and so forth. Individual travelers can also create their own custom annotated maps.

The system 100 can be used to create genealogical-related maps. These maps may trace the migration of family members over time. Such a map can be linked with photographs of family members, interesting family-related documents (such as birth certificates, wills, etc.), and so forth.

The system 100 allows users to log the locations of certain sales discounts, such as the locations of gas stations offering relatively inexpensive gas, the locations of food stores offering specials on certain items, and so forth.

The system 100 can be used by real estate agents to map the locations of properties for sale, along with salient information regarding the properties.

The system 100 can be used by event organizers (such as conference organizers) to provide salient information regarding an event, such as the location of motels and restaurants near the event, a schedule for the event, and so forth.

The system 100 can be used by national and international business chains to map the locations of their outlets. The maps can also provide photographs of merchandise offered by these sites, details of discounts being offered, and so forth.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for annotating a digital map, comprising:
   associating an object with a location within a digital map;
   assessing a popularity of the object, wherein assessing the popularity of the object is based at least in part on determining a number of users who have clicked on the object in the digital map;
   selecting a zoom range over which the object is to be presented within the digital map based on the assessed popularity;
   determining an object zoom level based on the selected zoom range;
   associating the object zoom level with the object in relation to the digital map;
   receiving an instruction to present the map at a requested zoom level;
   determining whether to present the object within the digital map depending on whether the requested zoom level lies within a range specified by the object zoom level; and
   presenting the map based on an outcome of the determining.

2. A method as recited in claim 1, wherein the object zoom level comprises a minimum zoom level, such that the object is presented within the map if the requested zoom level is greater than or equal to the object zoom level and such that the object is not presented within the map if the requested zoom level is less than the object zoom level.

3. A method as recited in claim 1, wherein the object zoom level comprises a maximum zoom level, such that the object is presented within the map if the requested zoom level is less than or equal to the object zoom level and such that the object is not presented within the map if the requested zoom level is greater than the object zoom level.

4. A method as recited in claim 1, wherein the object zoom level comprises a minimum zoom level and a maximum zoom level, such that the object is presented within the map if the requested zoom level is less than or equal to the maximum zoom level and greater than or equal to the minimum zoom level, and such that the object is not presented within the map if the requested zoom level is greater than the maximum zoom level or less than the minimum zoom level.

* * * * *